United States Patent [19]
Okuniewicz

[11] Patent Number: 6,146,276
[45] Date of Patent: Nov. 14, 2000

[54] PROGRAMMABLE ELECTRONIC ACTIVITY DETECTOR AND COMMAND GENERATOR FOR ELECTRONIC DEVICES

[76] Inventor: Douglas M. Okuniewicz, 2 Deer Trail, Council Bluffs, Iowa 51503

[21] Appl. No.: 08/994,075

[22] Filed: Dec. 19, 1997

Related U.S. Application Data

[63] Continuation-in-part of application No. 08/795,152, Feb. 7, 1997, Pat. No. 5,908,354.
[51] Int. Cl.[7] .............................. A63F 13/00; A63F 9/24; G06F 17/00; G06F 19/00
[52] U.S. Cl. ........................ 463/35; 463/43; 273/142 B; 381/61
[58] Field of Search ................................. 463/35, 43, 20; 704/270; 273/142 B, 143 R; 381/1, 61; 434/185

[56] References Cited

U.S. PATENT DOCUMENTS

| | | | |
|---|---|---|---|
| 4,569,019 | 2/1986 | DiOrio et al. | 364/410 |
| 5,472,197 | 12/1995 | Gwiasda et al. | 273/143 R |
| 5,579,537 | 11/1996 | Takahisa | 455/66 X |
| 5,638,426 | 6/1997 | Lewis | 379/90 X |
| 5,813,511 | 9/1998 | Takemoto et al. | 194/217 X |
| 5,830,064 | 11/1998 | Bradish et al. | 463/22 X |
| 5,835,126 | 11/1998 | Lewis | 348/8 X |

*Primary Examiner*—Jessica J. Harrison
*Assistant Examiner*—Binh-An Nguyen
*Attorney, Agent, or Firm*—Adam H. Jacobs

[57] ABSTRACT

The present invention provides a programmable electronic activity detector and command generator for electronic devices, particularly a casino gaming device, which includes at least one read-only detection device such as an optic isolator, which is adapted for connection to an electronic apparatus, the read-only detection device operative to detect selected event occurrences on an electronic apparatus and output event occurrence notification signals upon detection of an event. An event detection sampling device is connected in information transmission connection with the read-only detection means, the event detection sampling device operative to detect and receive event occurrence notification signals from the detection devices, analyze the received event occurrence notification signals and output event occurrence information signals including information specifying event occurrences. Connected in information transmission connection with the event detection sampling device is an event occurrence information signal computing device which is operative to receive and analyze the event occurrence information signals output by the event detection sampling device and upon detection of selected event occurrence information signals, output command signals for initiating at least one connected output device to perform a selected operation corresponding to the outputted command signal. The output device is operative to accept command signals from the programmable event occurrence information signal computing device and output the appropriate response corresponding to the command signal.

12 Claims, 26 Drawing Sheets

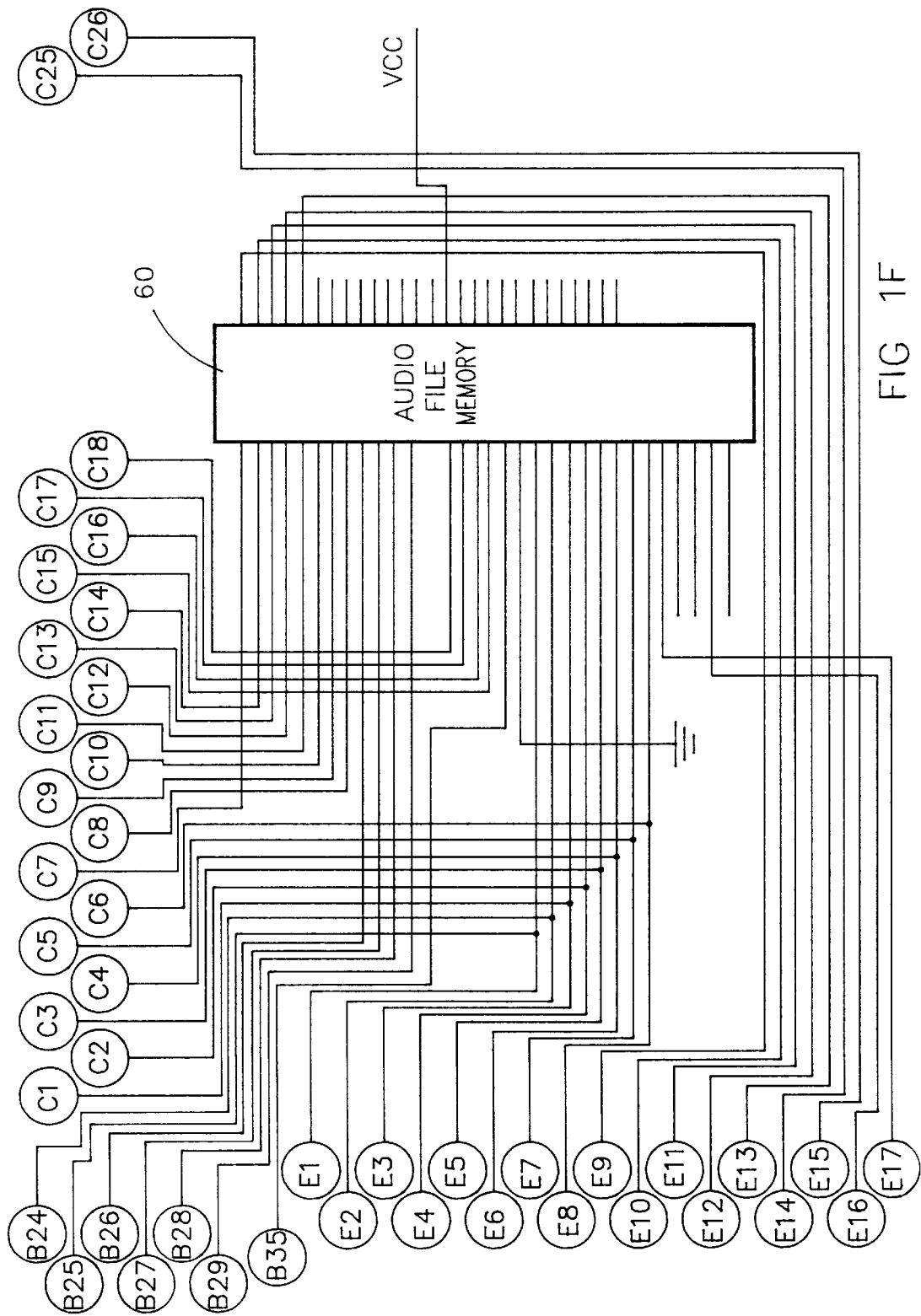

PROGRAMMABLE ELECTRONIC ACTIVITY DETECTOR AND COMMAND GENERATOR FOR ELECTRONIC DEVICES

CROSS-REFERENCE TO RELATED APPLICATION

This application is a Continuation-In-Part of patent application Ser. No. 08/795,152 filed Feb. 7, 1997, now U.S. Pat. No. 5,908,354.

BACKGROUND OF THE INVENTION

1. Technical Field

This invention relates to electronic activity detection devices and, more particularly, to a programmable electronic activity detector and command generator for electronic devices which includes at least one read-only detection device connected to a circuit board of an electronic apparatus, an event detection sampling device in information transmission connection with the read-only detection device, a programmable event occurrence information signal computing device connected to the event detection sampling device and a programmable event occurrence information signal computing device for outputting command signals therefrom for commanding connected output devices to perform desired functions in response to specific occurrences on the electronic apparatus circuit board.

2. Description of the Prior Art

Slot machines and video poker machines continue to be the most widely used types of gaming devices found in the gaming industry. The oldest slot machines and video poker machines were relatively simple devices which included little in the way of sound generating devices, commonly including only a bell or buzzer to signify a winning combination on the reels. With the advent of new technology in the gaming industry, the slot machines and video poker machines were now able to produce a variety of pre-programmed sounds through the use of computer chip technology. These chips are most often constructed as integral parts of the gaming device and are programmed at the factory to produce a limited number of sounds in response to events such as a winning combination coming up on the reels. The sounds produced by the machine can be of high quality through the use of efficient loudspeaker systems.

In spite of the use of such new technology, one of the major disadvantages found in the prior art regarding the sounds produced by the slot machine has gone unaddressed. Specifically, because the chips are programmed by the factory, the sound produced by the machine cannot be changed by the customer, i.e., the casino. The sounds produced by the gaming device thus are always the same, and the gaming public may lose interest in play of the machine due to the lack of any changes in the output of the machine when winning combinations are produced. It is important to understand that on most machines the sound information and the payout tables are programmed on the same chip. If a user of the gaming device wishes to modify the sounds produced by the machine, the chip containing the sound bytes must be "reburned" or reprogrammed by the factory or the casino. The reprogramming of the chip, however, will mandate review and testing of the chip by an independent testing laboratory and by the state gaming commission to confirm that nothing on the chip was modified except for the sounds themselves. Obviously, if retesting of the chip each time the smallest change in sound produced by the chip is necessary, no casino location will wish to go through the process due to the length of time involved. There is, therefore, a need for a sound-producing device for inclusion in a gaming device which is capable of being quickly and easily reprogrammed to produce a different sound in response to a particular event occurrence, and which does not require retesting by an agent of the gaming commission each time a new sound is included.

It is thus seen that a disadvantage of the prior art is that the sound-producing devices found in gaming devices cannot be modified by the casino to produce alternative sounds. However, it is a further disadvantage of the prior art that the sound-generating devices on all but the newest machines are often technologically insufficient to produce such sounds as human speech and difficult-to-reproduce sounds. It therefore may be desirable to enhance the sound-producing capabilities of the gaming device by "adding on" a more sophisticated sound card. Due to restrictive gaming regulations, however, any such add-on sound card would have to be incapable of influencing the outcome probabilities of the gaming device, thus requiring a type of read-only detection means for detecting specific event occurrences on the electronic circuit board or the reels of the gaming device. At present, such read-only detection devices are not found in the prior art, as most, if not all, of the sound-producing devices found in the prior art are integrated into the gaming device and such read-only detection devices are not necessary. With the rapid improvement in sound cards, however, the need for non-intrusive read-only detection devices for use in combination with an add-on sound card has arisen. There is therefore a need for such a read-only detection device used in combination with an add-on sound card.

One of the most recent innovations in gaming is the multi-machine jackpot, such as Quartermania, Megabucks and Cool Millions. In these games, a bank of gaming machines are connected to one another in information transmission connection such that coin input at each of the machines adds to an overall jackpot which can be hit on the any of the machines in the group. These wide-area progressive games have acted to increase game play thus increasing the handle of the casino. The disadvantage to such wide-area progressive games is that the casino is again prevented from modifying the sound output of the machine when a jackpot or other winning combination is achieved. The casino may desire to formulate its own location-specific games, such as treasure hunts or other such games, in which the treasure would be "found" by a specific reel combination turning up on the machine. Should such a reel combination come up on the machine, the player would be notified by casino-specific sounds emanating from the machine. It also may be desirable to have "treasure hunts" between multiple casino locations having wide-area progressive games, but again the sounds emitted by the machine must be modified to reflect the new game play. Obviously, the sounds included in the machine from the factory are not designed with this type of option in mind, and it would be necessary for the casino to be able to interrupt the ordinary sound production of the gaming device and substitute its own desired sound output for particular event occurrences. It is believed that the variety offered by such sound variations will significantly increase "coin in" on the various machines due to the heightened interest in the modified games.

Another disadvantage found in those devices representative of the prior art is that the when an update of sound produced is desired, the chip carrying the sounds must be reprogrammed or "reburned". As was stated previously, on many machines the sound wave files are played by the same chip that controls the payouts and pay tables for the machine. Therefore, each time the chip is reprogrammed to issue new sounds, the modified chip must be retested by an independent laboratory and the state authorities. Obviously, a casino organization which has invested millions of dollars in slot machines does not wish to lose the use of the slots for a period of time during testing each time the sounds produced by the machine are modified. There is therefore a need for an easily updatable and reprogrammable sound-producing device for use in slot machines and the like that will increase the usable life span of the slot machine and, more importantly, require only a single round of testing when initially added to the machine.

There are several examples of devices in machines proposed in the prior art which attempt to increase the amount of "coin in" by increasing interest in the games. For example, Nishikawa, U.S. Pat. No. 4,522,399, discloses a device for generating an impact sound for a slot machine, the device intentionally producing an impact sound when reels start to be rotated by motors. Clearly, however, this device cannot be modified in any meaningful way to produce a variety of sounds and thus its application to the gaming industry is limited.

A different approach to increasing interest in gaming is taken by Takemoto, et al., U.S. Pat. Nos. 5,472,195 and 5,375,830, which disclose, respectively, a display system at a game machine island and a slot machine comprising a plurality of liquid crystal displays. It is important to note that each of these inventions emphasize the visual aspects of the gaming devices in order to promote increased game play, but only addresses in standard fashion the auditory aspects of the gaming experience. Note that each of the devices includes only a simple sound card or a sound-producing device, and thus neither of the Takemoto inventions address the problem of reprogrammability presently found in the prior art.

Although the above description refers generally to a programmable sound card device, it has been found that there is even a greater need for a programmable electronic activity detector and command generator for electronic devices which may be connected to a number of difference output devices, such as light, a printer, or even a sound generation device such as a sound board. As was stated previously, any such add one electronic activity detector would have to be incapable of influencing the outcome probabilities of the gaming device, and thus a unit directional detection device for detecting specific event occurrences on the electronic circuit board would be required. In a typical slot machine, there are numerous machine event occurrences which would need to be sampled in order to determine whether the particular event has occurred. These include such occurrences as a bill accepted into the machine, a jackpot being hit, coin in, coin out and other display data. Each of these machines inputs and outputs would need to be monitored to determine event occurrences, but must be monitored in such a way that the event occurrence cannot be tampered with in order to conform to applicable gaming regulations. Therefore, as was stated previously, there is a need for a read-only electronic activity detector and command generator which is capable of detecting event occurrences on the circuit board of a gaming device and then issue appropriate demands in response to those event occurrences which will cause connected output devices to perform designated tasks.

By way of clarification, the electronic activity detecting portion of the card is that portion of the card that will identify that an event is taking place within the machine (i.e. coin in, jackpot. etc . . . ), and the command portion of the card is that portion which recognizes the event and dictates the proper response. Although it is expected that one of the major output functions of any card performing these functions would be that of sound reproduction, there is also a need for other types of outputs, including printer functions, lights and gaming information. It is important to note that there are no devices found in the prior art which can be connected to one or more output devices such as a sound card, a printer, a set of lights or a player's card information system. There is therefore a need for a device which can read and react to gaming machine outputs, and, depending on the programming of the device, output the appropriate command signals to output devices to drive the output devices to perform their respective functions.

Therefore, an object of the present invention is to provide a programmable electronic activity detector and command generator for electronic devices.

Another object of the present invention is to provide a programmable electronic activity detector and command generator for electronic devices which includes at least one read-only detection device adapted for connection to an electronic apparatus which is operative to detect selected event occurrences on the electronic apparatus and output event occurrence notification signals upon detection of an event.

Another object of the present invention is to provide a programmable electronic activity detector and command generator for electronic devices which includes an event detection sampling device in information transmission connection with the detection devices, the event detection sampling device operative to receive and detect the event occurrence notification signals from the detection devices, analyze the signals and output information specifying which events have occurred on the electronic apparatus circuit board.

Another object of the present invention is to provide a programmable electronic activity detector and command generator for electronic devices which includes a programmable event occurrence information signal computing device in information transmission connection with the event detection sampling device, the computing device operative to receive and analyze event occurrence information signals output by the event detection sampling device and upon detection of selected event occurrence information signals, output command signals for initiating operation of output devices such as an audio board, a printer or assorted lights.

Another object of the present invention is to provide a programmable electronic activity detector and command generator for electronic devices which includes a read/write audio signal storage memory device in information transmission connection with the programmable event occurrence information signal computing device, the memory device operative to store audio signals in retrievable form and output those audio signals in response to reception of sound generation command signals.

Another object of the present invention is to provide a programmable electronic activity detector and command generator for electronic devices which may be quickly and easily reprogrammed by the casino itself to produce different outputs in response to the same reel combinations turning up on the machine.

Another object of the present invention is to provide a programmable electronic activity detector and command generator for electronic devices which may be "added-on" to already existing gaming devices to enable the potentially outdated machine to be reinvigorated by production of an alternative group of sounds by the machine.

Another object of the present invention is to provide a programmable electronic activity detector and command generator for electronic devices, particularly a casino gaming device, which is capable of sampling event occurrences on the circuit board of the gaming device that is clearly incapable of influencing the outcome of any gaming event in the gaming device, thus permitting the electronic activity detector and command generator to be added to gaming machines while requiring only a single inspection by a gaming commission. Future operational modifications will not require reinspection by the gaming commission.

Finally, another object of the present invention is to provide a programmable electronic activity detector and command generator for electronic devices which is durable in construction and safe and efficient in use.

SUMMARY OF THE INVENTION

The present invention provides a programmable electronic activity detector and command generator for electronic devices, particularly a casino gaming device, which includes at least one read-only detection device such as an optic isolator, which is adapted for connection to an electronic apparatus, the read-only detection device operative to detect selected event occurrences on an electronic apparatus and output event occurrence notification signals upon detection of an event. An event detection sampling device is connected in information transmission connection with the read-only detection means, the event detection sampling device operative to detect and receive event occurrence notification signals from the detection devices, analyze the received event occurrence notification signals and output event occurrence information signals including information specifying event occurrences. Connected in information transmission connection with the event detection sampling device is an event occurrence information signal computing device which is operative to receive and analyze the event occurrence information signals output by the event detection sampling device and upon detection of selected event occurrence information signals, output command signals for initiating at least one connected output device to perform a selected operation corresponding to the outputted command signal. The output device is operative to accept command signals from the programmable event occurrence information signal computing device and output the appropriate response corresponding to the command signal.

The present invention also provides a programmable sound-producing device for an electronic apparatus, the device including at least one read-only detection device adapted for connection to the electronic apparatus, the read-only detection device operative to detect selected event occurrences on an electronic apparatus and output event occurrence notification signals upon detection of an event. The read-only detection devices are connected in information transmission connection with an event detection sampling device operative to detect and receive event occurrence notification signals from the detection devices, analyze the event occurrence notification signals and output event occurrence information signals including information specifying event occurrences. A programmable event occurrence information signal computing device is connected in information transmission connection with the event detection sampling device, the signal computing device operative to receive and analyze event occurrence information signals output by the event detection sampling device and upon detection of selected event occurrence information signals, output sound generation command signals for initiating generation of selected sounds by the programmable sound-producing device. Connected in information transmission connection with the programmable event occurrence information signal computing device is a read/write audio signal storage memory device operative to store audio signals in retrievable form and access and output selected audio signals in response to reception of sound generation command signals from the programmable event occurrence information signal computing device. Finally, an audio signal output device in information transmission connection with the audio signal storage memory device is provided for transferring the selected audio signals from the read/write audio signal storage memory device to a sound-producing device such as a speaker, the audio signal output device operative to convert the audio signals to a format for driving a sound-producing device such as a loudspeaker.

The advantages of the present invention over those devices found in the prior art are numerous and include the fact that the present invention may be added to any existing gaming device to produce alternative command outputs in response to event occurrences in the electronic apparatus, thereby engaging various output devices. Furthermore, because the present invention is reprogrammable in a quick and easy manner, a variety of response schemes may be instituted over the life span of a gaming device, thus insuring that consumer interest in the game remains relatively high. Also, because the present invention only samples events off of the electronic apparatus and cannot be used to modify the probabilities of gaming occurrences, it is believed that the present invention will be acceptable for use with slot machines and the like without requiring any more than a single additional inspection and certification by the gaming commissions of the various states. Because the computing device on the programmable electronic activity detector and command generator may be programmed to interrupt the normal sound and display output of the gaming device and substitute an alternative sound or display, exciting new varieties of games may be introduced even though the new game is being played on the old piece of gaming machinery. Also, one of the most exciting features of the present invention is that unique messages such as advertisements for casino activities and the like or interactive gaming experiences can be included in the programmable electronic activity detector and command generator, and the variety of potential messages is unlimited. Therefore, the present invention provides a substantial improvement over those devices found in the prior art.

BRIEF DESCRIPTION OF THE DRAWINGS

FIGS. 1A–1F are schematic diagram of the elements and connections of the sound-producing device of the present invention;

DESCRIPTION OF THE PREFERRED EMBODIMENT

The following description discloses two embodiments of the present invention. The first embodiment is the programmable sound card 10, which is best shown in FIGS. 1A–4 in schematic format. The actual physical structure of the sound card is not critical to the functioning of the invention and, therefore, the following description will focus mainly on the circuitry features of the invention. It is to be understood, however, that the programmable sound card 10 will preferably be of a standard size and shape as sound cards commonly found in the prior art, although variations in size and shape will fall under the intended broad scope of the appended claims.

Figure 4:
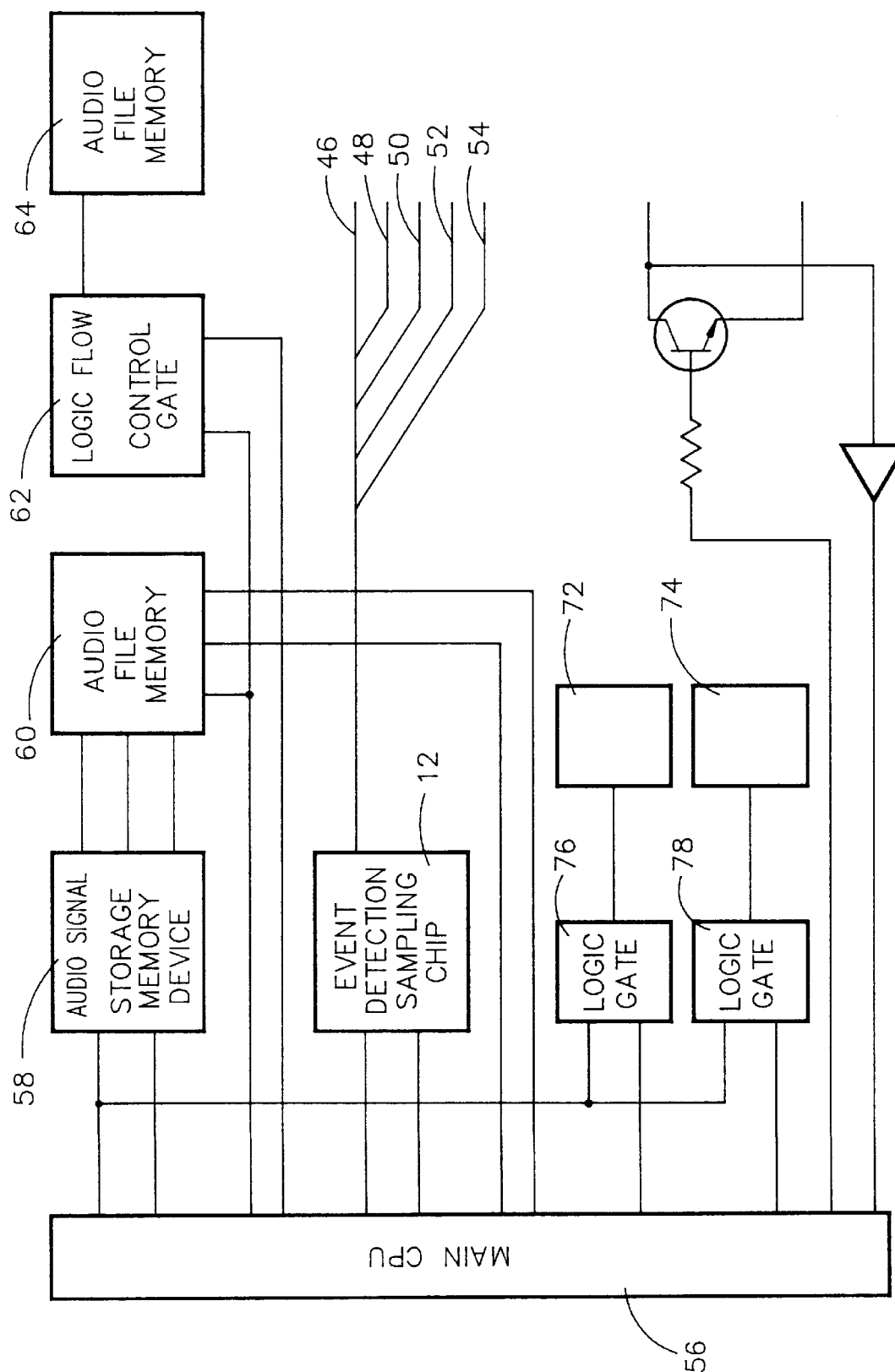
FIG. 4 is a high level block diagram of the present invention showing the elements of the present invention.

The programmable sound card 10 of the present invention is best shown in high-level detail in FIG. 4 as including three separate EPROM microcontroller chips 12, 56, and 58, each of which, in the preferred embodiment, would be an eight-bit CMOS microcontroller manufactured by Microchip Technology, Inc., part No. PIC16C6X. Of course, it is to be understood that numerous other types of microcontrollers may be used with the present invention provided those microcontrollers are programmable to perform the same or similar operations as will be described below.

To provide the interface between the programmable sound card 10 and an electronic circuit board, chip 12 is an event detection sampling chip 12 programmed to detect and receive event occurrence notification signals, analyze those signals and output information regarding a specific event occurrences.

Figure 5:
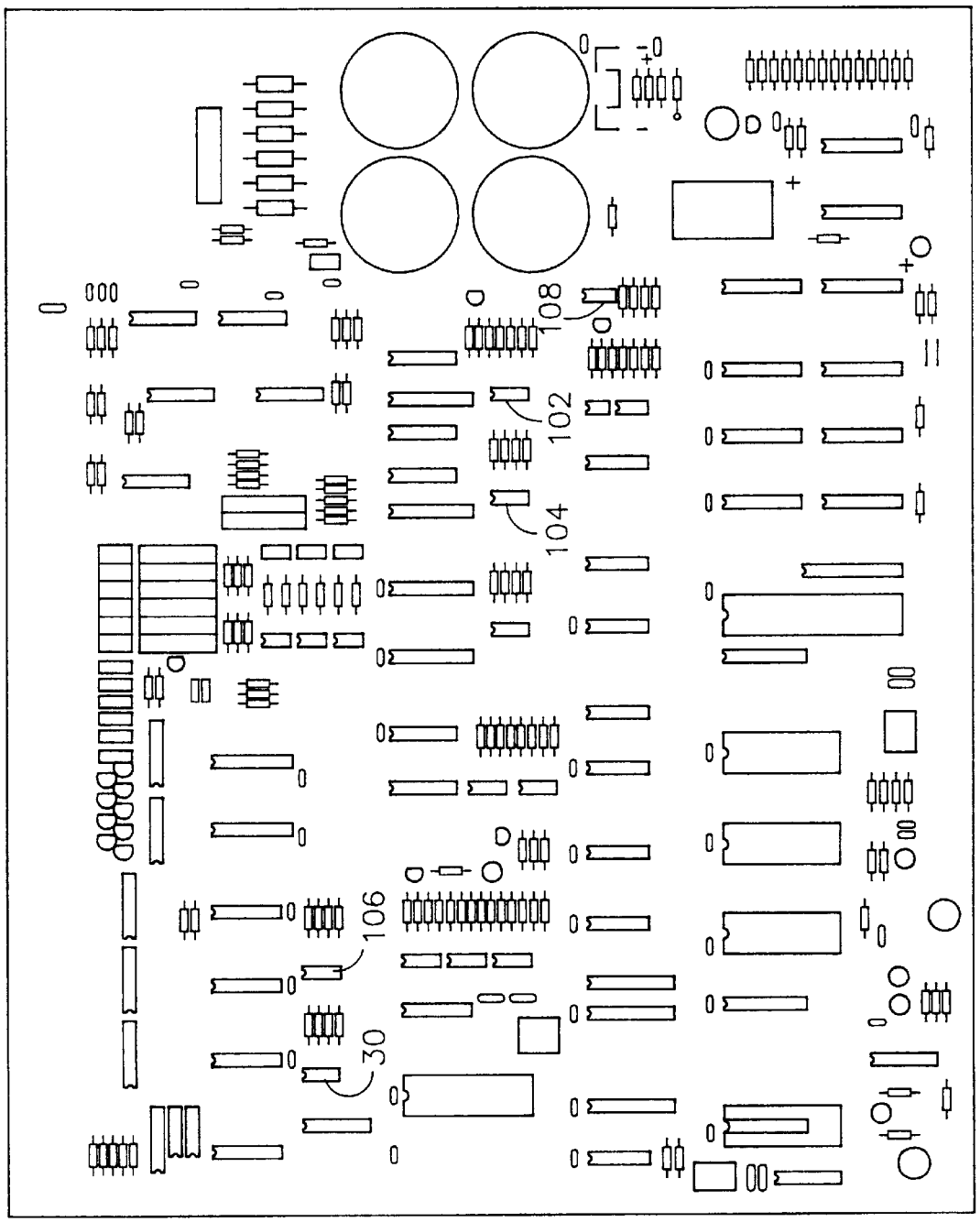
FIG. 5 is a block diagram of a typical gaming device circuit showing the sampling points used by the present invention.

On a standard slot machine board 100 as shown in FIG. 5, there are three main lines of serial communications which control most of the slot machine's operations. These data lines are commonly known as "OUT", "IN" and "DISP". The "OUT" line handles all output information including the lighting of the machine's candle, the lighting of any of the machine's panel lights, and any other machine operations which require initiation of the particular operation by the machine. The "IN" line handles all input information, including coin in, handle pull and any other data input initiated by the machine operator. Finally, the "DISP" line handles all display data for display on the LED screen of the slot machine, such as credits available. A serious operational problem arises when data on the slot machine board 100 needs to be sampled by the event detection sampling chip 12 due to the numerous restrictions placed on the slot machine industry by gaming commissions across the country. Specifically, the addition of foreign devices to slot machine boards necessitates review by the gaming commission of the state in which the casino is located, thus mandating review each time the slot machine is altered in any manner. However, it is the intent of the present invention to provide a non-intrusive sampling system which functions as a read-only detection device to not interfere with the operation of the slot machine.

Figure 2:
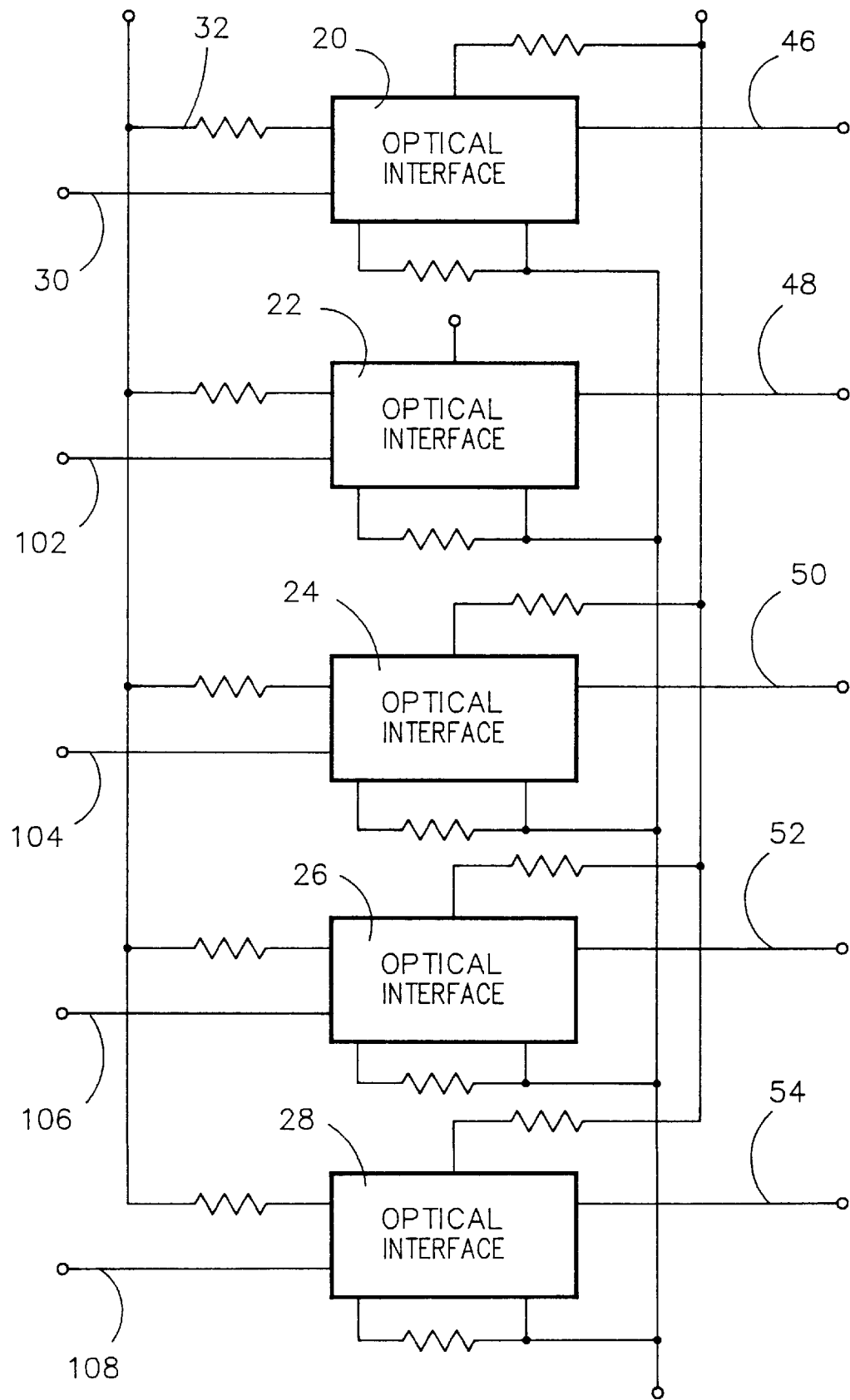
FIG. 2 is a circuit diagram of the read-only detection devices showing the interconnection of the devices.

In the preferred embodiment, the read-only detection devices would be a plurality of optical interfaces 20, 22, 24, 26, and 28, as best show in FIG. 2. The slot machine board 100 shown in FIG. 5 is similar to a standard IGT (International Game Technologies) game board, which includes the three lines of serial communications ("OUT", "IN" and "DISP") and additionally includes the "ILOAD" line and the "Clock" line of communications. The "ILOAD" line sends an end of frame signal and acts as a "secondary clock", and the "Clock" line provides a clock pulse used for synchronization of signals on the slot machine board 100. On the IGT board, data is sent to the registers of the chips on the board at discrete times as determined by the "Clock" line. Eight clock pulses constitute a packet and four packets constitute a frame, the end of the frame being signified by the "ILOAD" signal. At that signal the data collected in the registers is moved to the rest of the machine.

Figure 3:
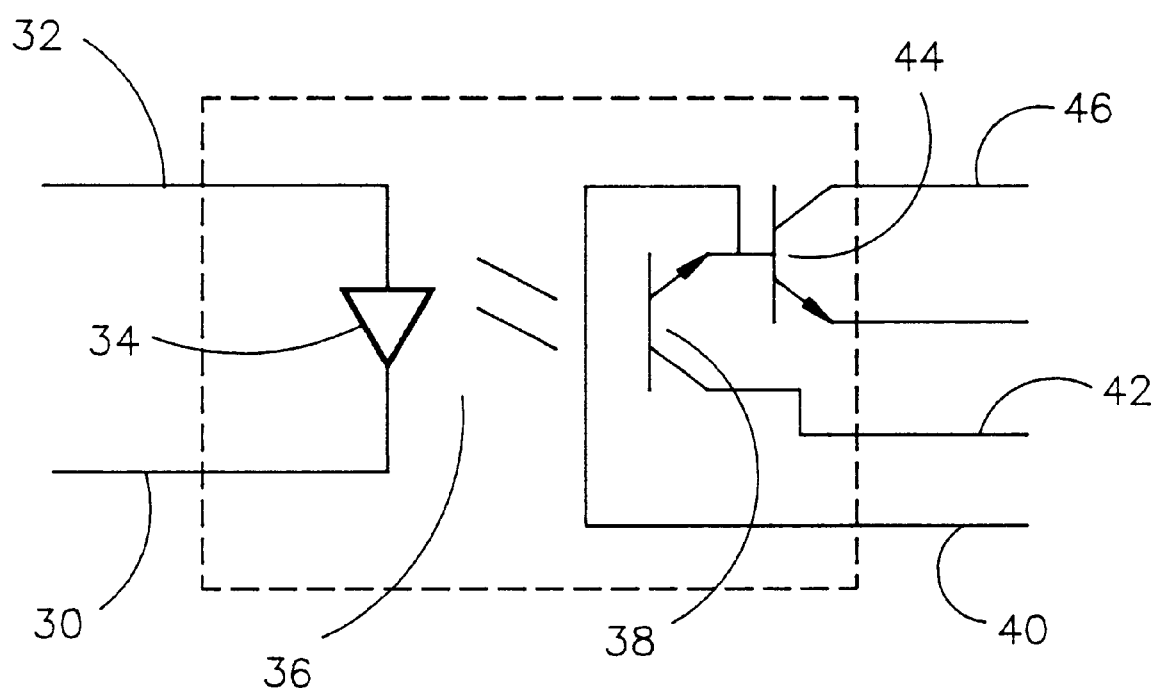
FIG. 3 is a detail diagram of one of the read-only detection devices of the present invention.

As best shown in FIGS. 2 and 3, optical interface 20 is connected to the "ILOAD" line 30, optical interface 22 is connected to the "CLOCK" line 102, optical interface 24 is connected to the "OUT" line 104, optical interface 26 is connected to the "IN" line 106 and optical interface 28 is connected to the "DISP" line 108. FIG. 5 shows a standard IGT board and the preferred sampling connection points for the optical interfaces 20, 22, 24, 26 and 28. Each of the optical interfaces 20, 22, 24, 26 and 28, are preferably identical and therefore the following description of optical interface 20 should be understood to apply to the other optical interfaces 22, 24, 26 and 28. Optical interface 20 is best shown in FIG. 3 as including two input lines, line 30 being the "ILOAD" line and line 32 being a +5 volt DC line coming from the slot machine board 100. Lines 30 and 32 are connected to one another by a light-emitting diode 34 which will emit a light pulse when a signal is sent down the "ILOAD" line. The light pulse emitted by the light-emitting diode 34 is detected by the light detection section 36 of the optical interface 20. The light detection section 36 of optical interface 20 preferably includes a light-sensitive transistor 38 connected to a ground line 40 at the output thereof and a +5 volt DC current line 42 attached to the input of the transistor 38. The output end of the transistor 38 is further connected to the base of a second transistor 44 which acts to transfer the signal to the ILOAD output line 46 which leads to the event detection sampling chip 12. Optical interface 20 thus transfers an exact duplicate of the signal output by the "ILOAD" line 30 to the ILOAD output line 46, the signal being sampled in a non-intrusive manner. Furthermore, because the light-emitting diode 34 is incapable of transferring signals to the "ILOAD" line 30 there is no possibility that event occurrences on the slot machine board 100 can be affected or changed by signals sent down the ILOAD output line 46. Each of the other optical interfaces 22, 24, 26, and 28 will operate in substantially the same manner.

An alternative sampling system for detection of specific game events would include a set of optic readers mounted on or adjacent the reels of the slot machine. Commonly, the multiple reels on the slot machine each have an optical detection device mounted adjacent the reel to allow the resulting reel combination to be read by the machine. The alternative sampling system of the present invention would add an optic reader to each reel at a location on the reel that would not interfere with the normal operation of the slot machine. The reel combination would be read by the optic readers and an offset figure would be applied to determine the precise reel combination turning up on the reels. In the preferred embodiment, the optic readers would be optic interrupter sensors including a light-emitting diode and a photo-transistor, the diode and transistor arranged such that the diode faces the transistor and the reel tabs are positioned therebetween. In this manner, when a tab passes between the diode and the transistor, the transistor detects the absence of light and the signal output by the transistor is interrupted, thus signaling the presence of the tab. The tab size corresponds to a particular symbol on the reel, and by applying the offset figure the reel combination may be detected. The resulting data on the reel combination would be used by the programmable sound card 10 in the same manner as the data taken directly from the circuit board 100 of the slot machine.

In the original embodiment, five output lines feed into the event detection sampling chip 12, the ILOAD output line 46, the CLOCK output line 48, the "OUT" output line 50, the "IN" output line 52, and the "DISP" output line 54. The event detection sampling chip 12 is programmed to constantly monitor the output lines 46, 48, 50, 52, and 54, as the data flow on most slot machine boards 100 is constant. The event detection sampling chip 12 thus acts as a kind of "babysitter" chip which constantly monitors the data lines for event occurrence notification signals sent down the output lines 46, 48, 50, 52, and 54. The preferred microcontrollers described previously are designed to be programmed using RISC code which is a low-level machine code programming language. One example of the program written to program the event detection sampling chip 12 is shown in Appendix "A", the specifics of which would be understood by anyone skilled in the art of RISC code programming. Of course, it is to be understood that numerous modifications, additions and substitutions may be made to the program disclosed in Appendix "A", and therefore the following descriptions shall refer to the functioning of the event detection sampling chip 12 and not specifically to the low-level machine code program.

As the event detection sampling chip 12 is constantly monitoring the data output lines 46, 48, 50, 52, and 54, any event occurrence notification signal output by the slot machine board 100 will be detected. The signals output by the slot machine board 100 are transferred by the event detection sampling chip 12 to determine which specific event has occurred in the slot machine. This translated information is then stored in the data storage registers within the event detection sampling chip 12. The precise location and number of registers within the event detection sampling chip 12 will be dependent upon the type of chip used in the programmable sound card 10 but it is expected that the event detection sampling chip 12 will be capable of storing upwards of 100 separate event occurrence notification signals.

Connected to the event detection sampling chip 12 in information transmission connection therewith is a programmable event occurrence information signal computing device 56 which will be referred to herein as the main CPU (central processing unit). The main CPU 56 is programmed to scan the registers within the event detection sampling chip 12 and remove, identify and compare the event occurrence notification signal found within the register of the event detection sampling chip 12 to a table of numbers preloaded or "hardcoded" into the registers of the main CPU 56 itself. These numbers held within the main CPU 56 correspond to selected event occurrence information signals which in turn correspond to particular machine events. For example, common machine events may include coin in, handle pull, jackpot, or any other payoff combination or the like.

As was described in connection with event detection sampling chip 12, the programming code used for the main CPU 56 again would be in RISC code, a preferred example of which is shown in Appendix "B". Again, however, it is to be understood that the exact object code to be used in the main CPU 56 is not critical to the invention so long as the main CPU 56 operates to perform all of its intended functions.

When the main CPU 56 identifies a match of an event occurrence information signal and a machine event number within the register of the main CPU 56, the main CPU 56 must signal the start of a sound byte. To clarify, the programmable sound card 10 of the present invention is designed to substitute casino-specific sound bytes for the sound bytes normally produced by the slot machine. Obviously, replacement of all of the sound bytes produced by the machine is not necessary nor even advisable in many instances and therefore the main CPU 56 is operative to replace only those sound bytes designated for replacement by the numbers entered in the registers of the main CPU 56 and allow the remaining sound bytes to be produced normally by the slot machine.

When the main CPU 56 detects a match of a selected event occurrence informational signal and a number held within the registers of the main CPU 56, a sound generation command signal is output by the main CPU 56. The main CPU 56 is in information transmission connection with a read/write audio signal storage memory device 58, commonly referred to herein as the memory manager. The memory manager chip 58 is programmed to keep track of the starting and ending points of the audio files stored in the audio file storage memory 60. The memory manager chip 58 also sets the 22 memory address lines used to access up to 2 Megabytes of memory for the audio files. Lastly, the memory manager chip 58 tracks the playback speed for each sound stored in the audio file storage memory 60. In the preferred embodiment, the memory manager chip 58 would include a table of audio file information organized in the following manner. The table would be seven (7) bytes wide (each byte including 8 bits) and up to 256 rows long, depending on the number of audio files present in the PC/MCIA card discussed below. Each row of information contains data for a specific audio file, with one byte containing information about the playback or sampling speed, three bytes containing information about the starting address of the audio file in memory, and the final three bytes containing information about the length of the audio file to be played.

The starting address of the audio file is stored in 22 of the 24 bits of the 3 bytes. The 22 bits are needed to access the 2 megabytes of sound data stored in the PC/MCIA card described below. Likewise, it is conceivable that a single audio file would be stored on the card, thus requiring the length of the audio file to be shown by a 22 bit number also, hence the 3 byte size of the length information. The sampling speed can be varied to produce sound quality that meets or even exceeds CD quality. It is preferred that if the value in the speed byte equals zero (0), that machine function will be unavailable and no sound will be substituted for the standard slot machine sound. A great benefit of the above-described method of sound file storage and access is that the same audio file may be accessed in response to several event occurrences, and the same file may even be "broken up" such that only a fragment of the audio file is played. For example, if the entire audio file contained the phrase "Wow, you've hit the jackpot", the present invention could play back "Wow" or "jackpot" or "jackpot hit, Wow" in any order, so long as the starting address of the individual words or phrases were stored by the memory manager chip 58. This versatility is unique in the gaming industry.

Appendix "C" shows a preferred program written for the memory manager chip 58 but again it is to be understood that the specific program and microprocessor used in the present invention is not critical to the invention so long as the memory manager chip 58 is capable of fulfilling all of its intended operations.

When the main CPU 56 detects a specific sound substitution, the main CPU 56 signals the memory manager chip 58 to initiate playback of the replacement audio file. The start location, length of sound byte and playback or sampling speed are downloaded by the memory manager chip 58 which loads the start location into the audio file storage memory 60 thus accessing the desired audio file. The memory manager chip 58 also signals a logic flow control gate 62 to open to allow audio file data to flow from the audio file storage memory 60 to a digital to analog converter unit 64 operative to convert the audio file downloaded from the audio file storage memory 60 into an audio wave that when sent to an amplifier (OP AMP) in a loudspeaker system will become the original sampled sound.

After the logic flow control gate 62 is opened, the playback speed for the audio file must be loaded into a timer 66 which controls the playback and sampling speed of the audio file. Each time the timer 66 resets, the memory address lines are updated to reflect the next memory location, the process continuing for the length of the audio file.

The main CPU 56 and the memory manager chip 58 work in conjunction to substitute the customized audio files stored in the audio file storage memory 60 for the standard output files housed within the slot machine. The sound ordinarily output by the slot machine is interrupted and the customized audio file is output in place thereof. The output lines from the digital to analog converter unit 64 feed into the slot machine amplifier such that when a signal is sent from the digital to analog converter unit, the sound the slot machine is attempting to issue is preempted and the customized sound byte is substituted. The actual interrupt mechanism can be of any suitable kind, but in the preferred embodiment, the interrupt mechanism would include an OP AMP to which the sound output line for the slot machine is connected and routed through. The op amp is also connected to the output of the digital to analog converter 64. When no audio file is sent out by the digital to analog converter 64, the sound output line is free to send the sound file data through to the amplifier. If an audio file is sent from the digital to analog converter 64, a voltage is built on the op amp input connected to the digital to analog converter 64 which causes the op amp to select the signal coming in on that input and disregard the signal from the sound output line. Once the audio stops, the voltage on the op amp input drains off and the input from the sound output line is re-selected.

The audio file storage memory device 60 is preferably a two megabyte PC/MCIA ram card which can be quickly and easily reprogrammed to include a variety of audio files. Of course, RAM and EPROM chips of any size could also be used, but is preferred that the PC/MCIA card be used for the ease of reprogrammability mentioned previously. Programming of a PC/MCIA card would be performed in a manner consistent with common programming techniques which would be understood by those skilled in the art of programming such cards. Preferably, the audio files would be stored in .WAV format (wave files) in memory. When a start address and length of file for a selected wave file is sent to the inputs of the audio file storage memory device 60, the data at that location and thereafter for the specified length is downloaded onto the data buss to the digital to analog converter 64. The digital bytes downloaded are taken in by the digital to analog converter 64 to create a voltage which varies between 0 and 5 volts in 256 discreet steps. This change in voltage results in an audio wave that when sent into an amplifier will become the original sampled sound. Of course, the number and length of the stored audio files may be increased by adding byte size to the audio file storage memory device 60 but it is believed that 2 megabytes of memory (which, when played at a low sampling rate may give 5 to 6 minutes of replayed sound) be sufficient for most, if not all, intended purposes of the present invention.

The above describes the main function of the programmable sound card 10. The programmable sound card 10 is designed to be retrofitted onto currently existing slot machines, although it could be easily used with newly manufactured machines and installed during the manufacturing process. The programmable sound card 10 provides a system by which each casino location may individualize some or all of the gaming devices on the casino floor by having the gaming device output particular sounds in response to machine events, those sounds differing from the factory preset sounds programmed into the slot machine. Such programmability clearly provides advantages for casino operators, including potential increase of coin in and further identification of the casino itself.

Of course, while the present invention has been described as including three separate programmable microcontroller chips, the three chips (the event detection sampling chip, the main CPU and the memory manager chip) could be combined and programmed onto a single central processing chip with the three separate chips represented thereon as three interconnected program sections. The advantage to such an arrangement is that the sound card 10 may be of simpler physical construction, but a disadvantage may be that the speed of the sound card is slightly compromised by the single chip design.

Figure 1A:
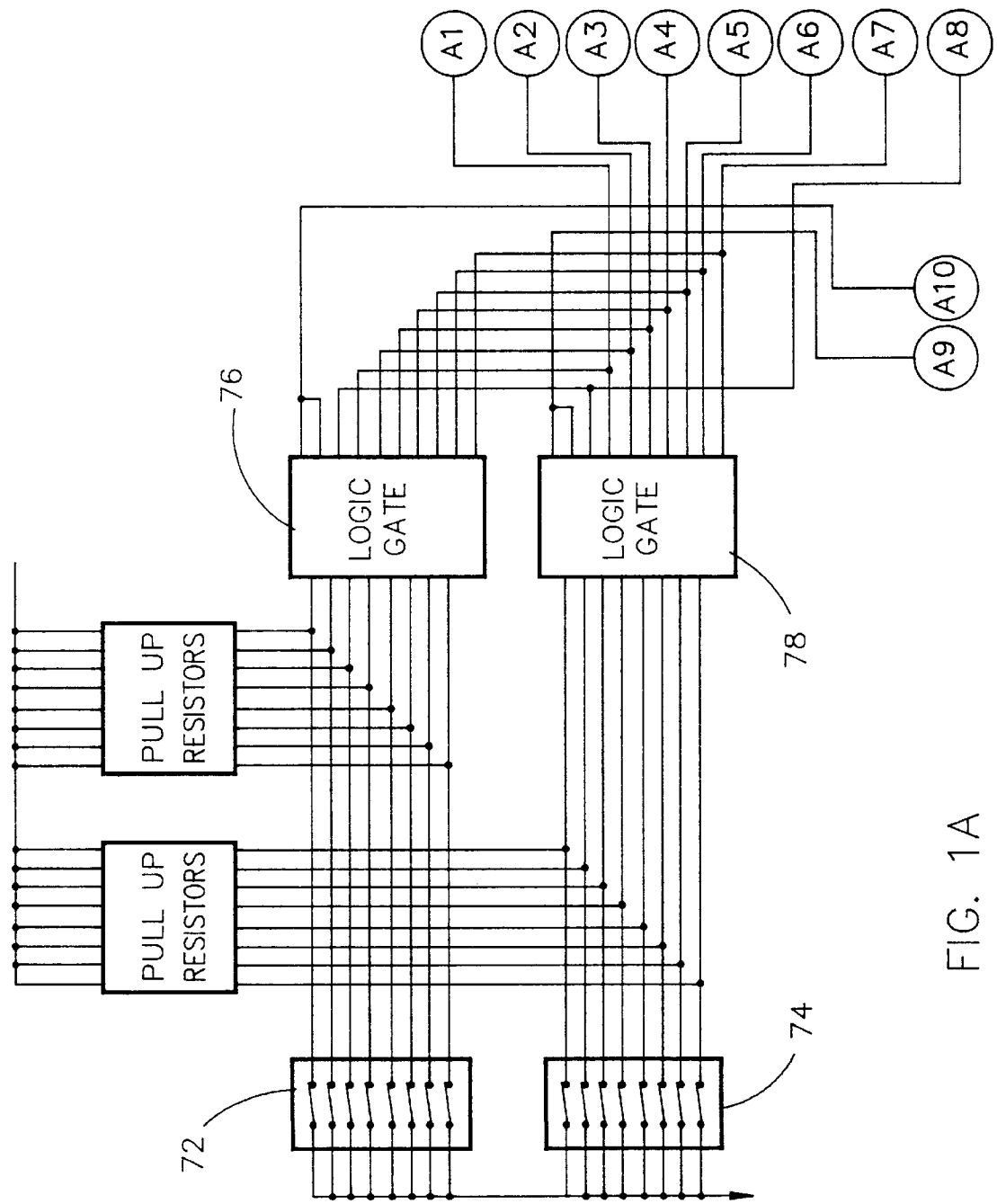
Figure 1B:
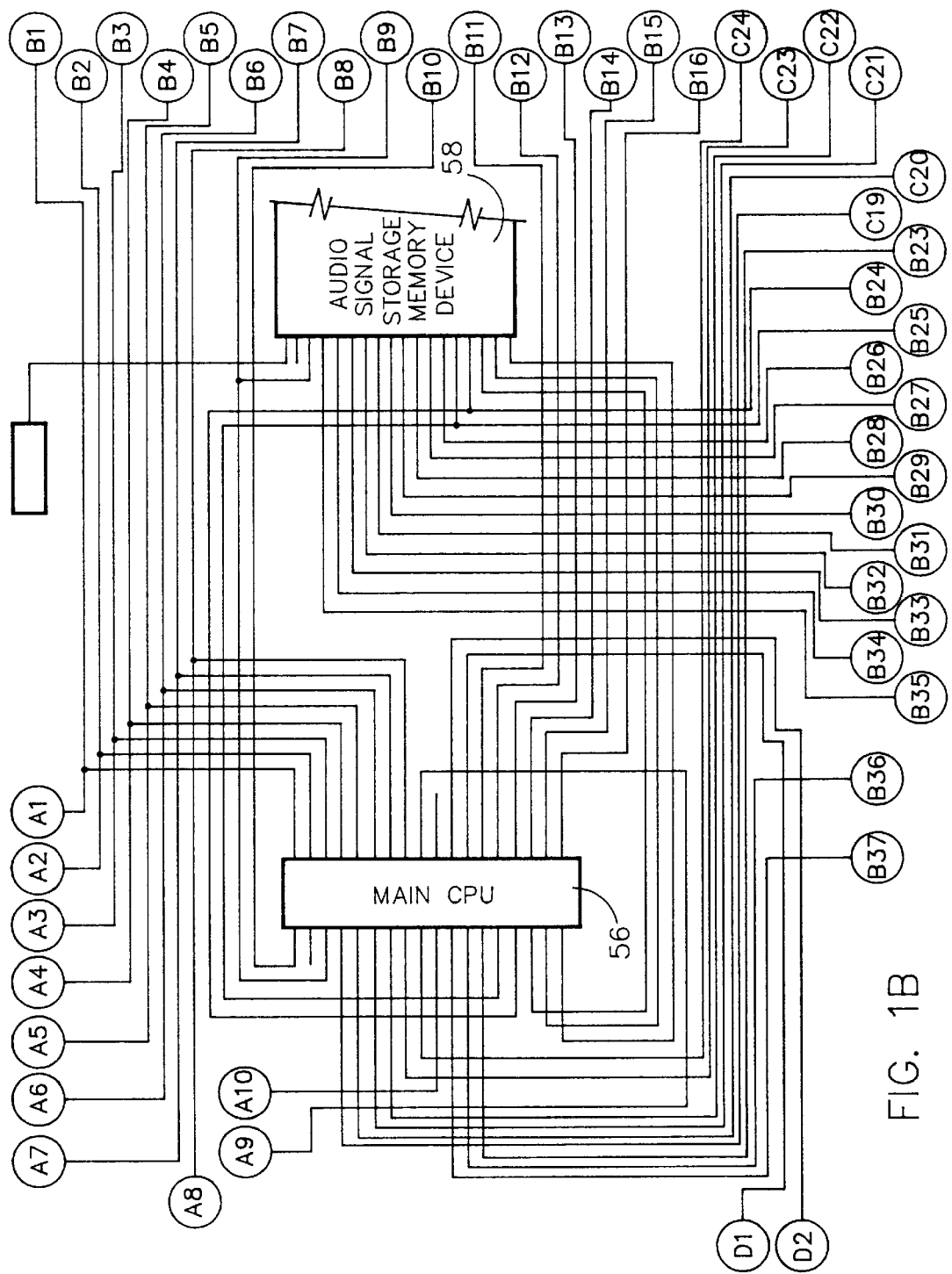
Figure 1C:
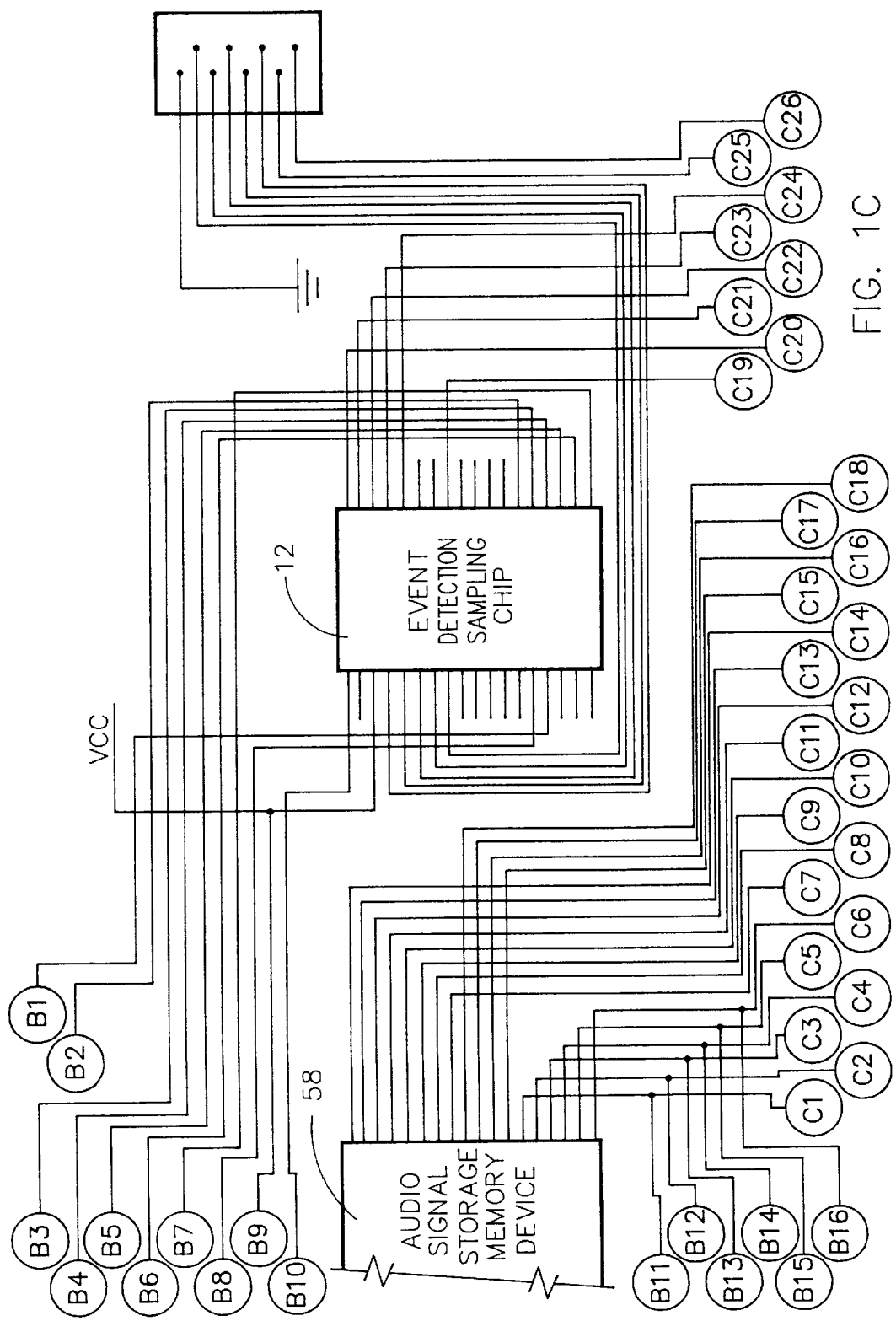
Figure 1D:
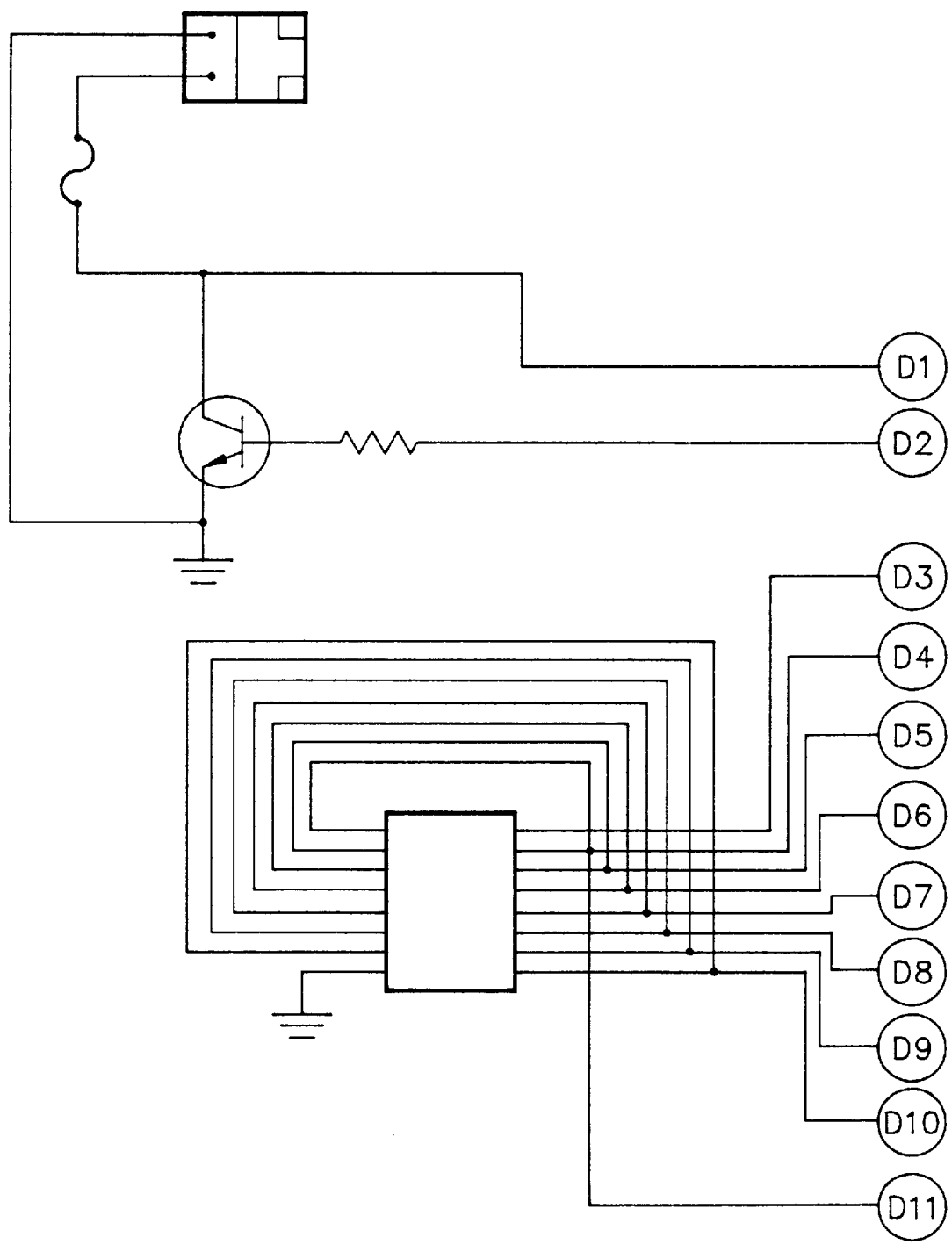
Figure 1E:
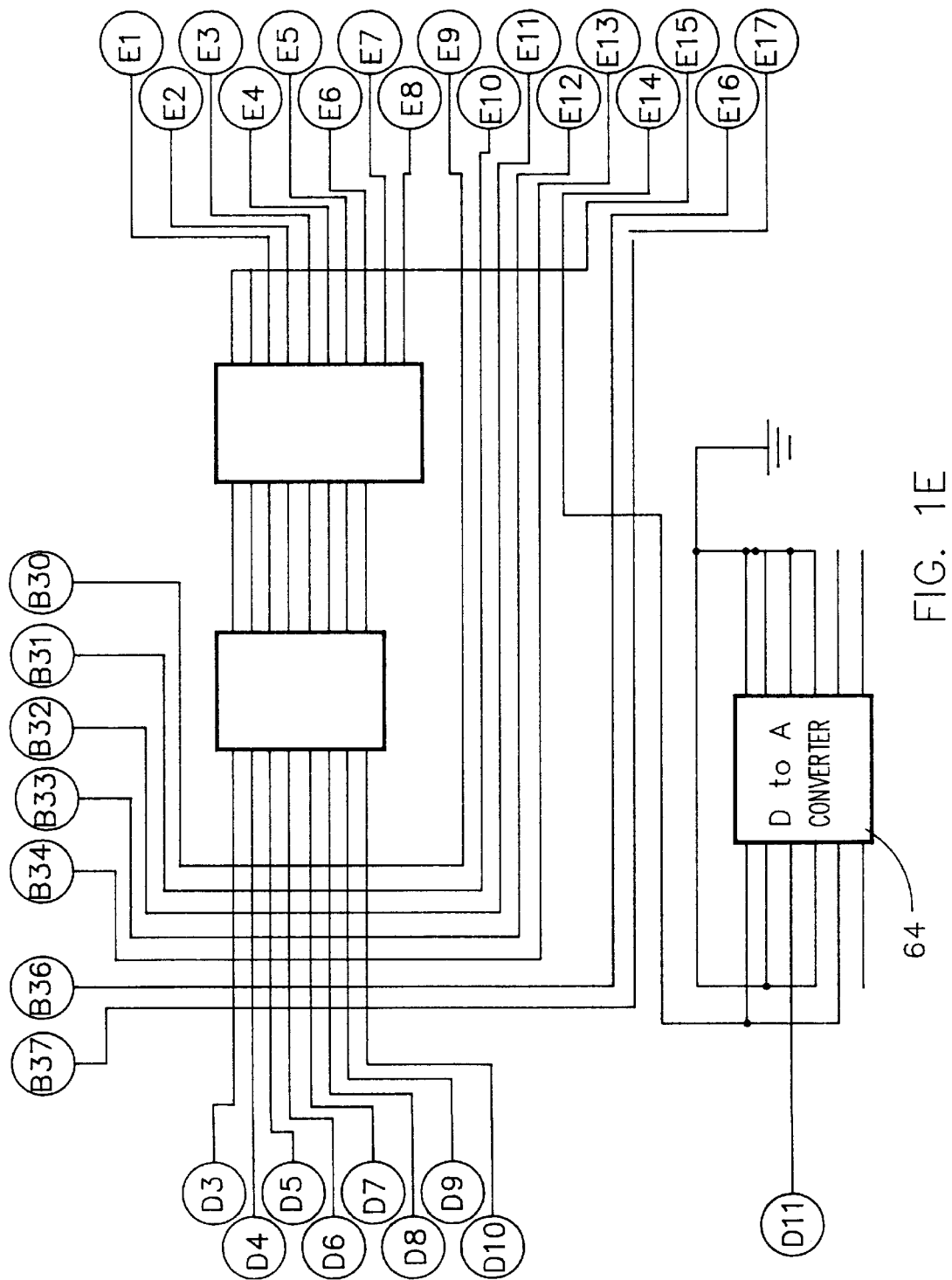

One additional feature of the present invention is that a number of programmable sound cards 10 of the present invention may be connected together in a network system such that downloads of new audio files may be coordinated from a central location. Shown in FIG. 1A illustrates two sets of address DIP switches 72 and 74 that can be read by the main CPU chip 56. These can be used for various purposes, but are intended to provide a way to identify each individual programmable sound card 10 with its own address. The 16 bits of the address DIP switches would allow a potential 64,535 units to be individually addressed by a central computer system.

Also, to provide such a network system, the individual cards must be hardwired to one another, which may cause a problem in already-existing casino locations. Obviously, if a new casino is being built, the casino floor can be constructed to include such hardwiring. For existing casinos, however, an alternative solution must be devised.

Most casinos are now wired for player's club information, in which the player enters his or her personal information into the system through a card format at the machine itself. This information is used by the casino to track slot machine activity and award bonuses or "comps" to big players. The most common system in use is a standard ASYNC communications protocol identical to that used in the RS-232 standard, and is made by IGT (the S.M.A.R.T. system). Most casinos use a 4-wire shielded cable for the S.M.A.R.T. system, and that 4th wire is not used for data transportation. In some situations that 4th wire of the IGT system (a ground) can be used to transfer data to and from the programmable sound card 10 installed in the slot machine. By using the one free wire no extra wire need be run thus allowing installation of the network into an existing S.M.A.R.T. system setup. Normal 3 wire systems can be used for other areas where wires can be run without presenting installation problems.

The network system is to allow the upload and download of audio files, event tables, special event sounds and advertisements. By linking the units in network, each unit can be updated remotely. While the network system has been described in general terms above, the implementation and function of such a system will not be described herein.

Figure 6:
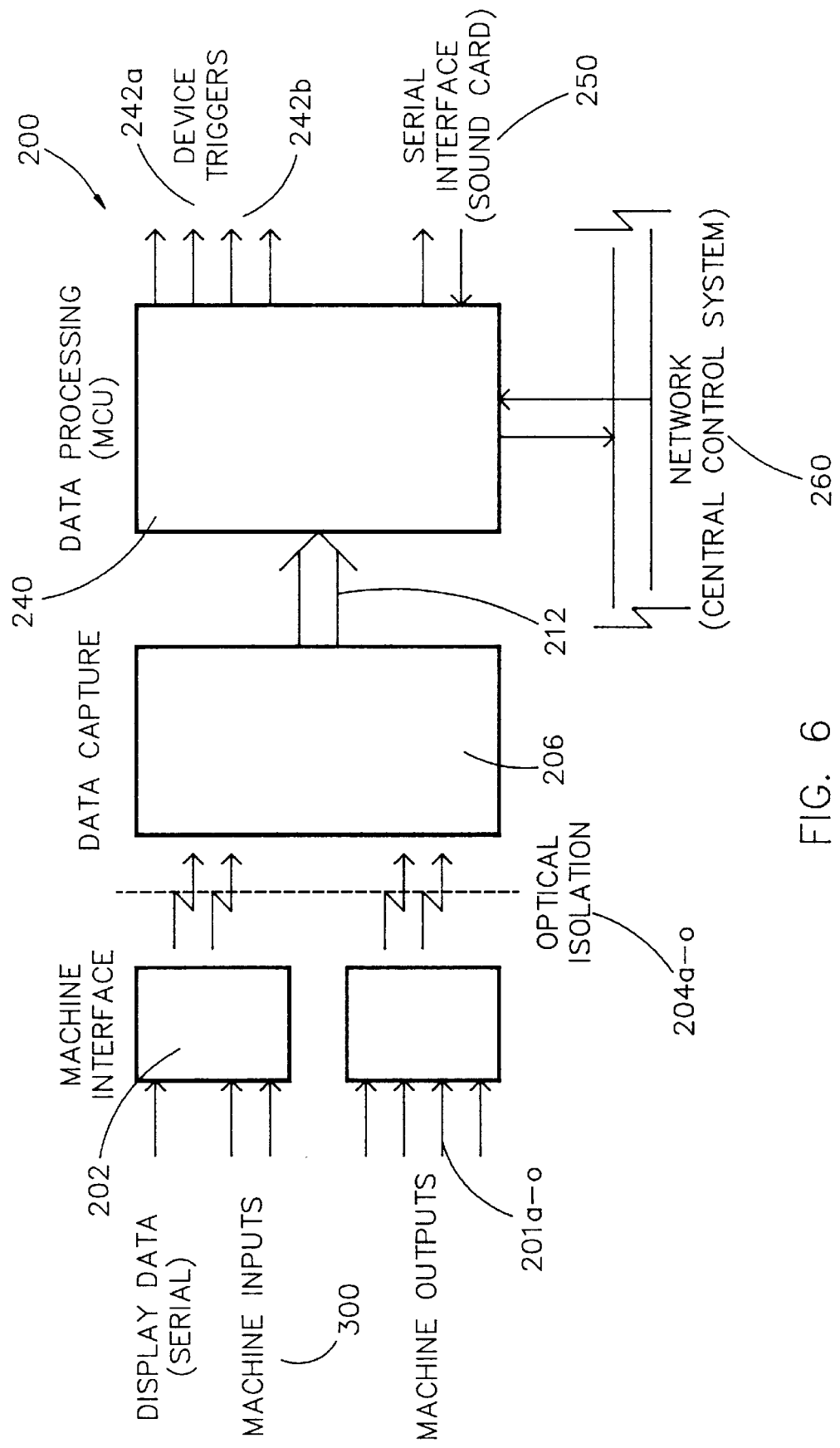
FIG. 6 is a high level block diagram of an alternative embodiment of the present invention showing the elements thereof.
Figure 7A:
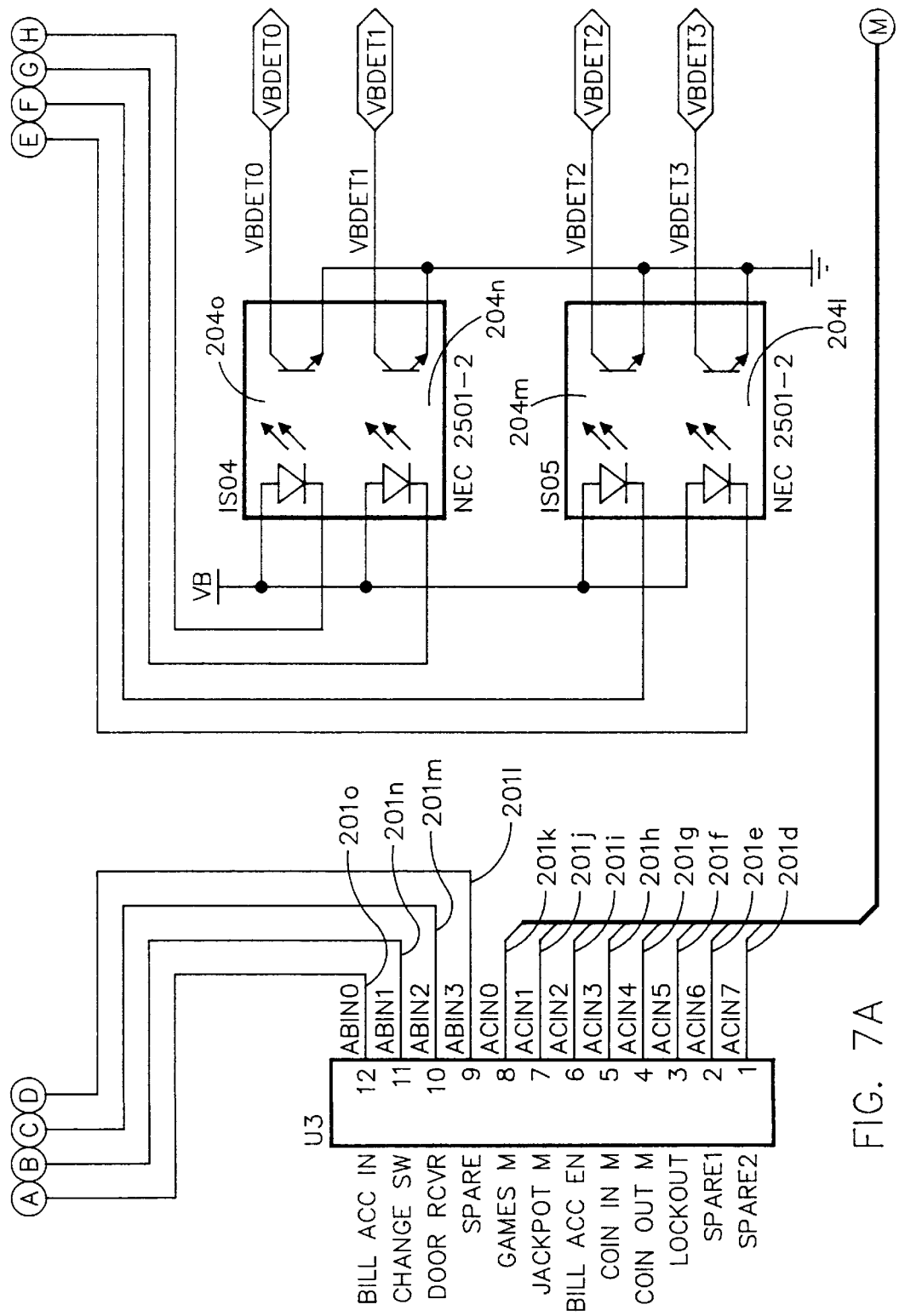
FIGS. 7A–7E are detailed circuit diagram of the input section of the electronic activity detector and command generator.
Figure 7B:
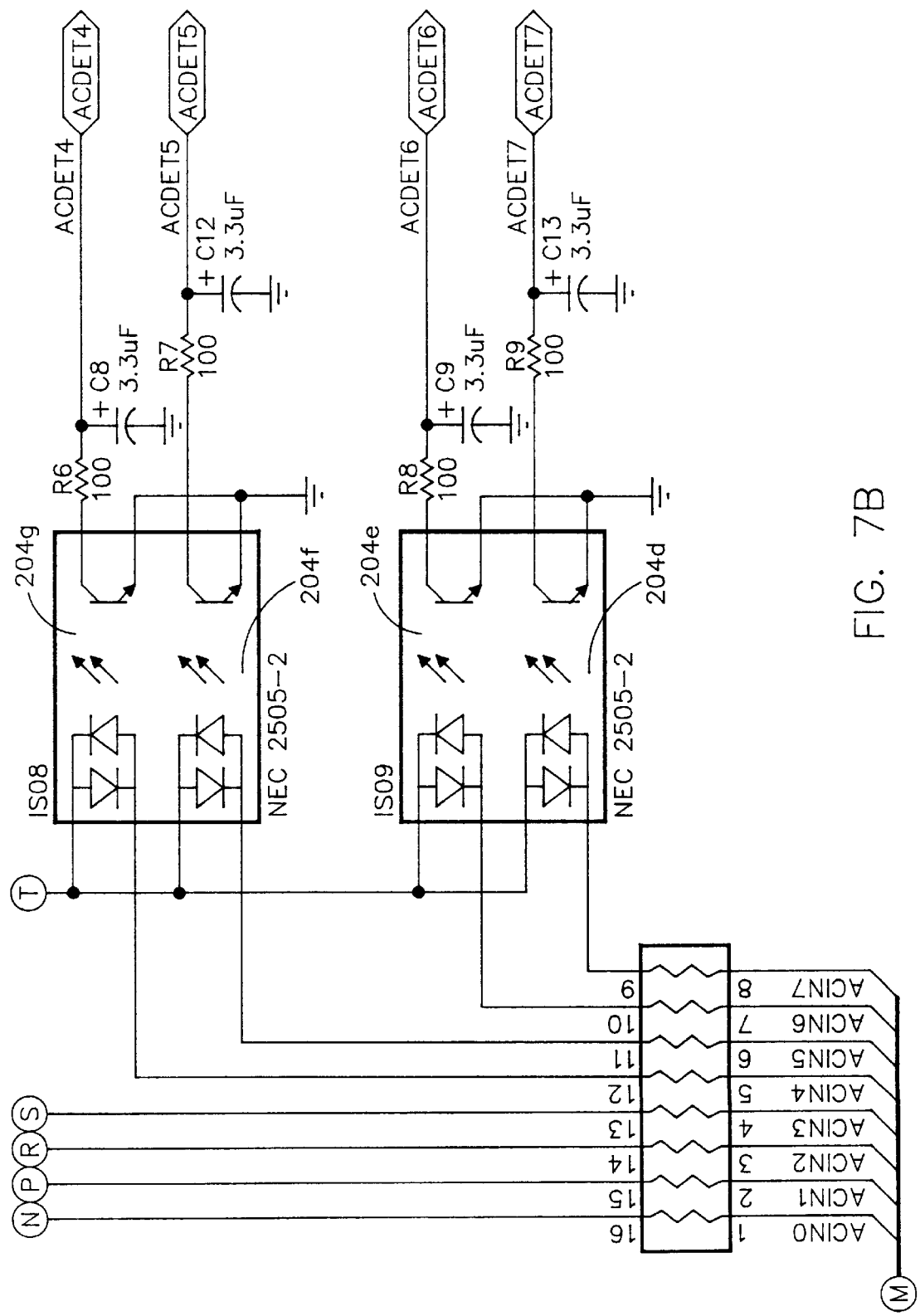
Figure 7C:
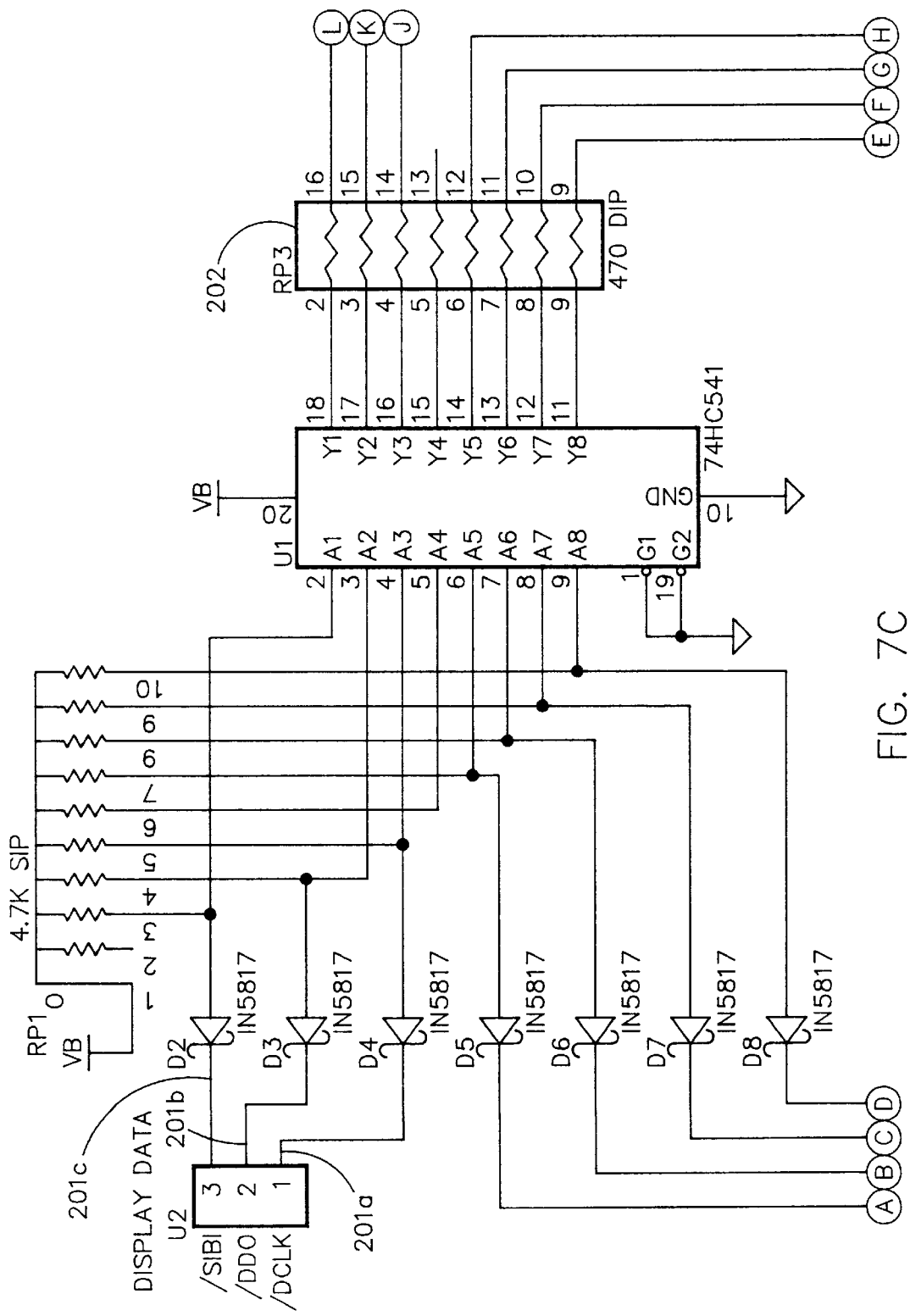
Figure 7D:
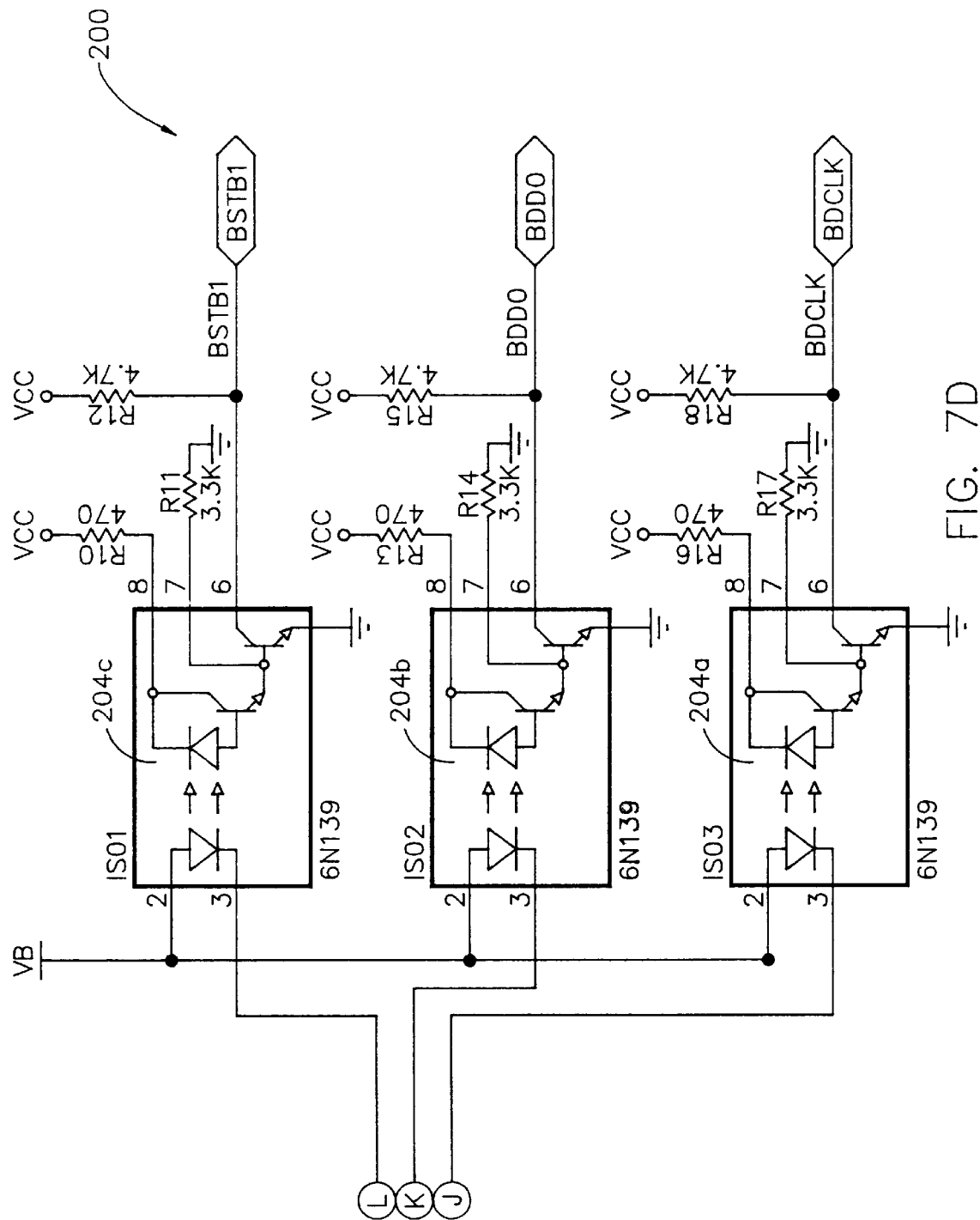
Figure 7E:
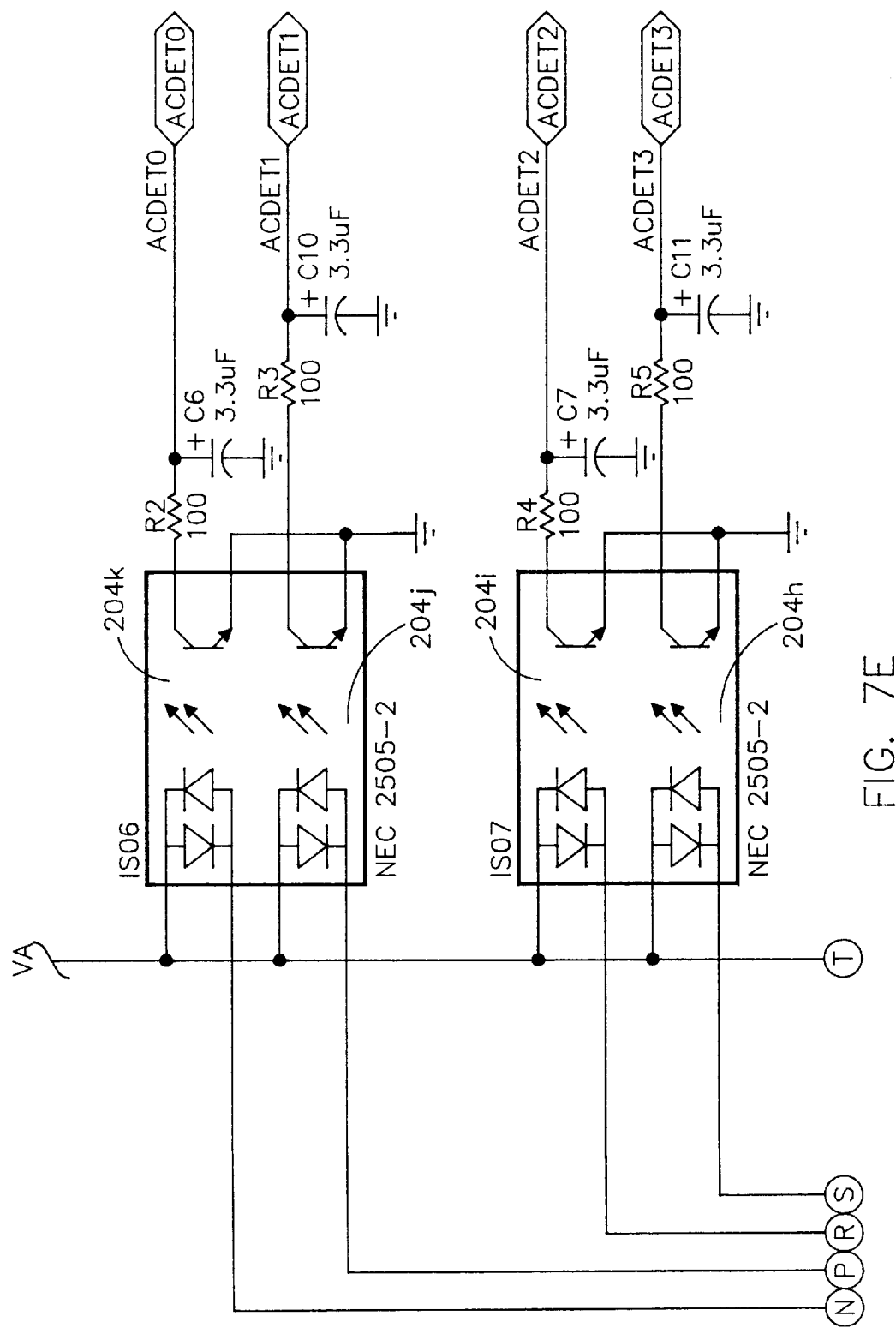
Figure 8A:
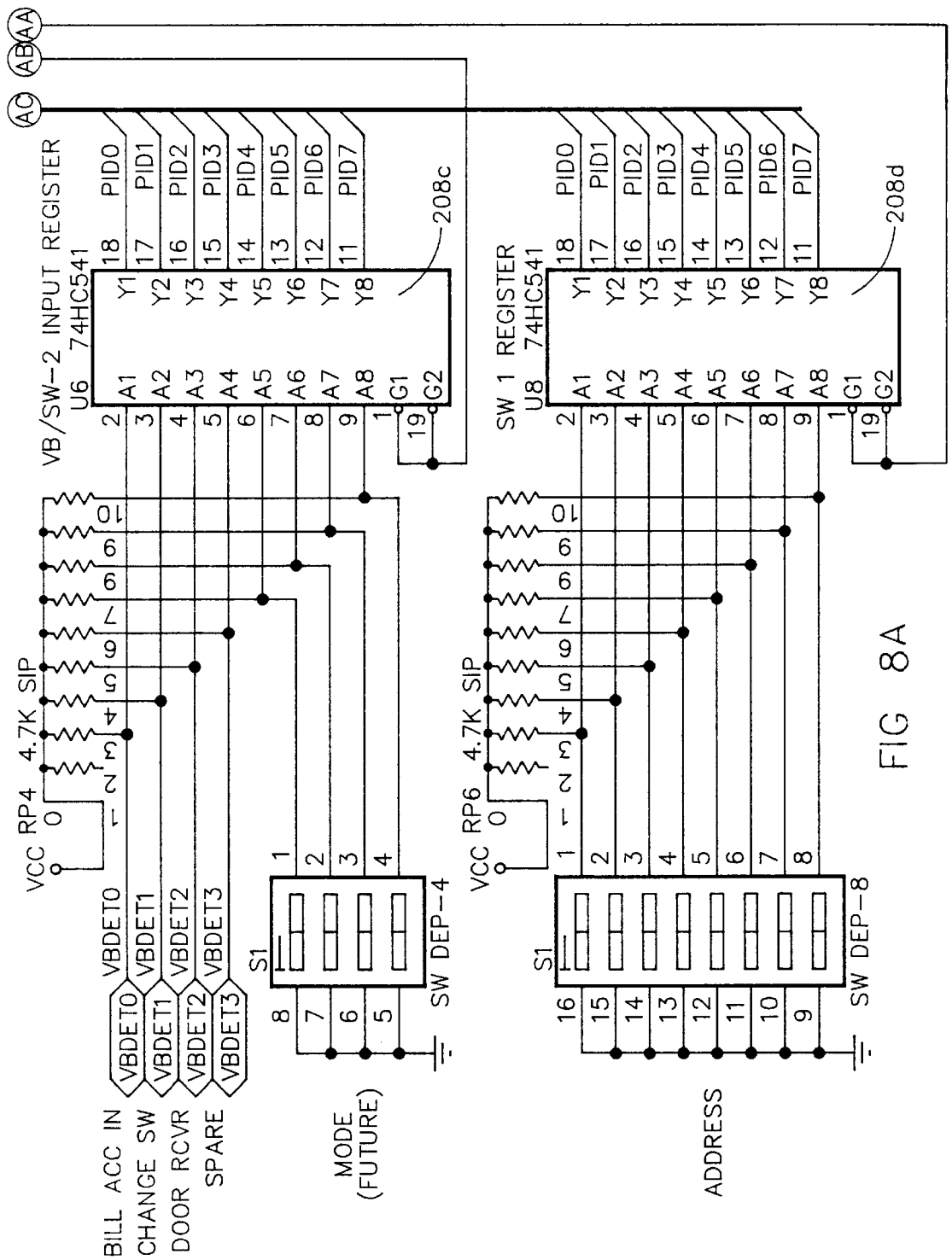
FIGS. 8A–8E are detailed circuit diagram of the event occurrence information signal computing device or main computing unit showing the inputs and outputs thereof.
Figure 8B:
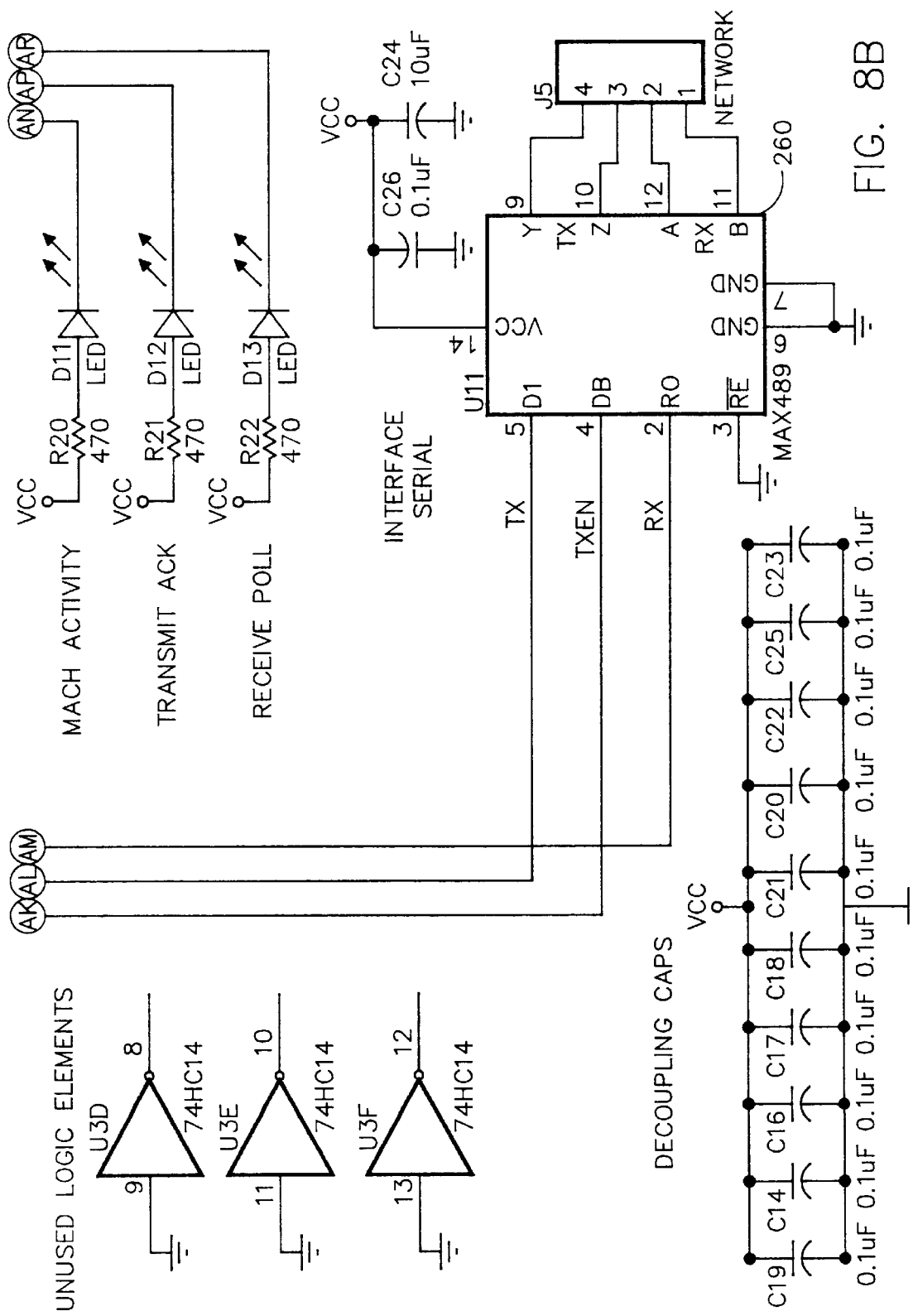
Figure 8C:
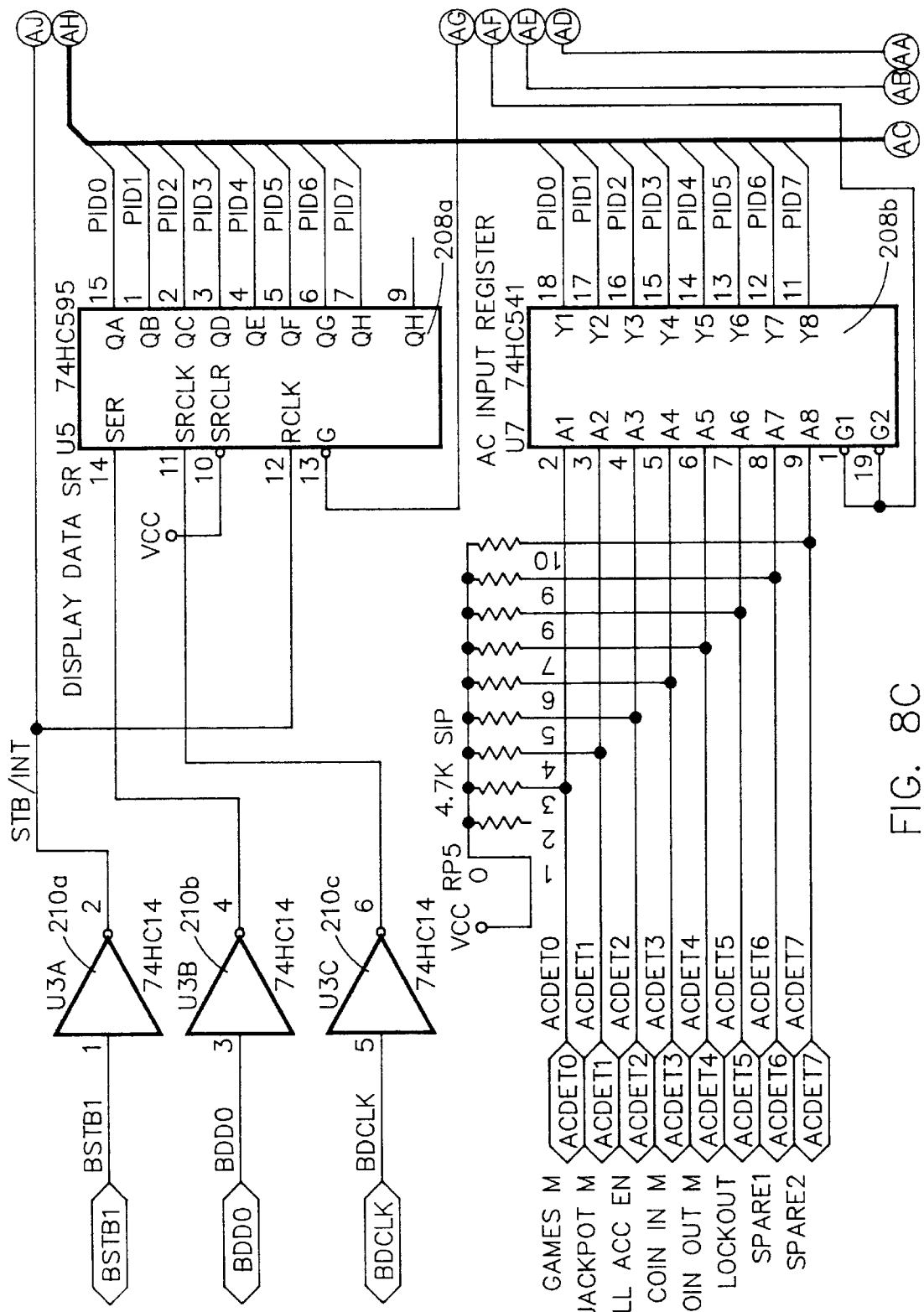
Figure 8D:
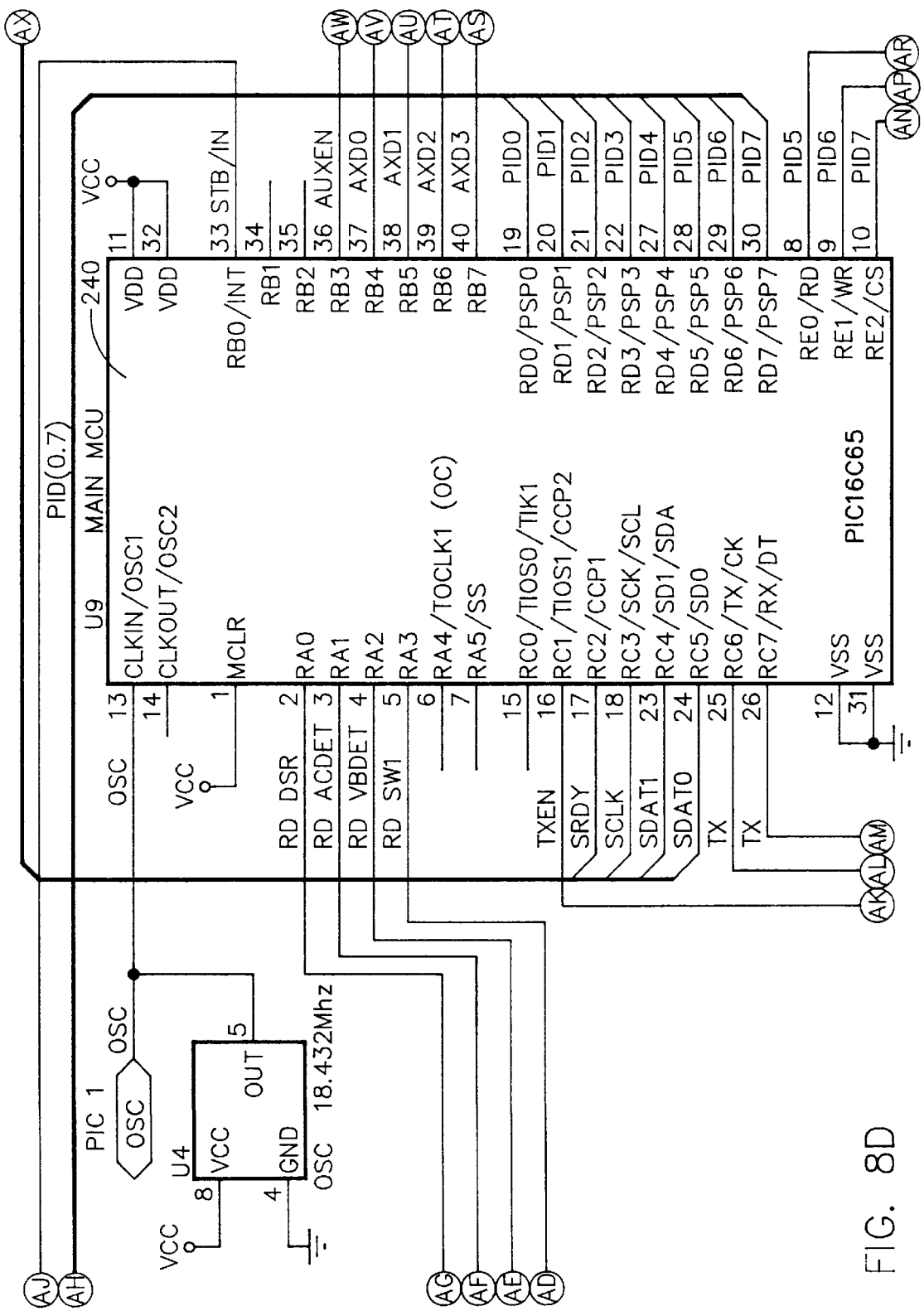
Figure 8E:
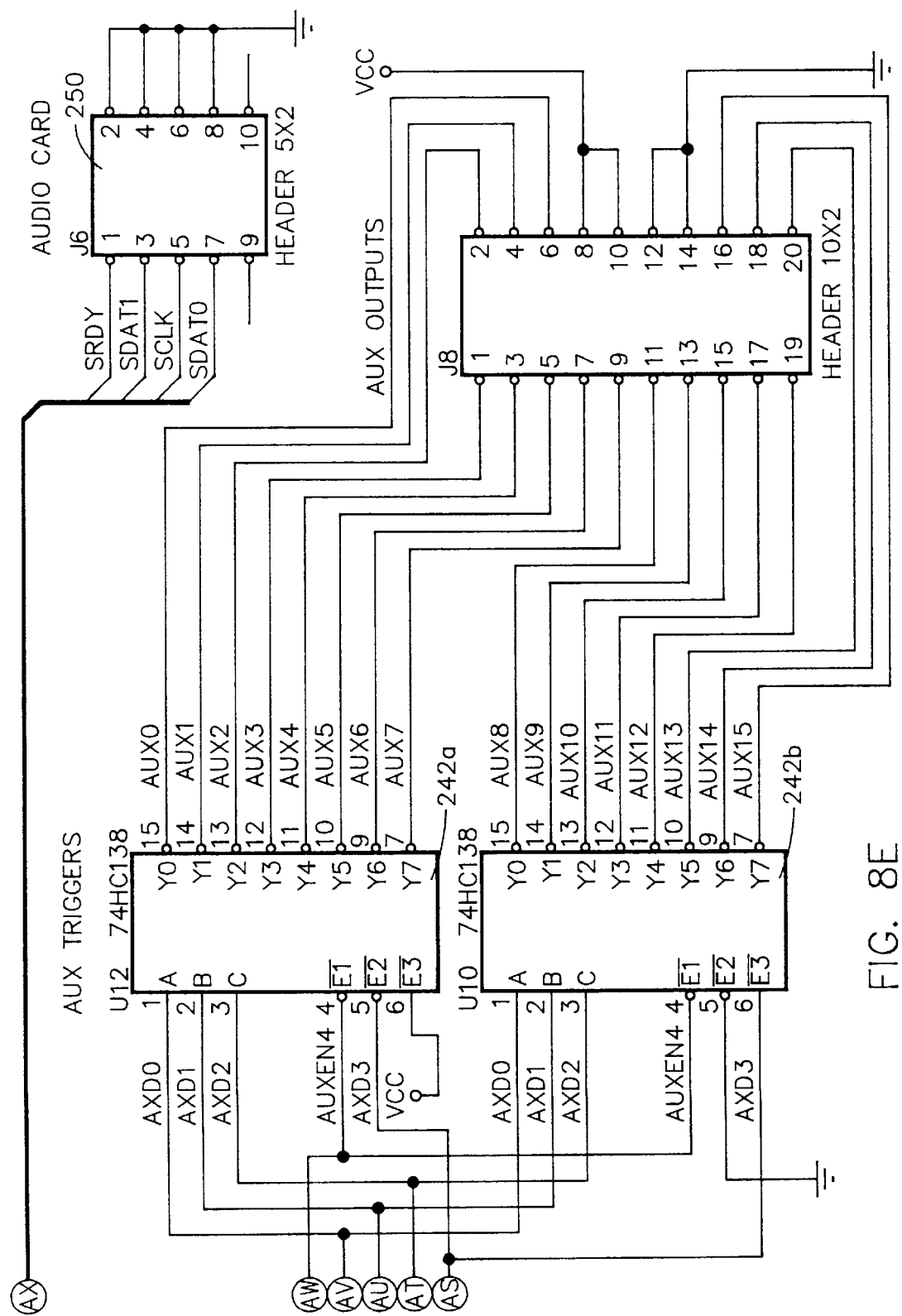
Figure 9A:
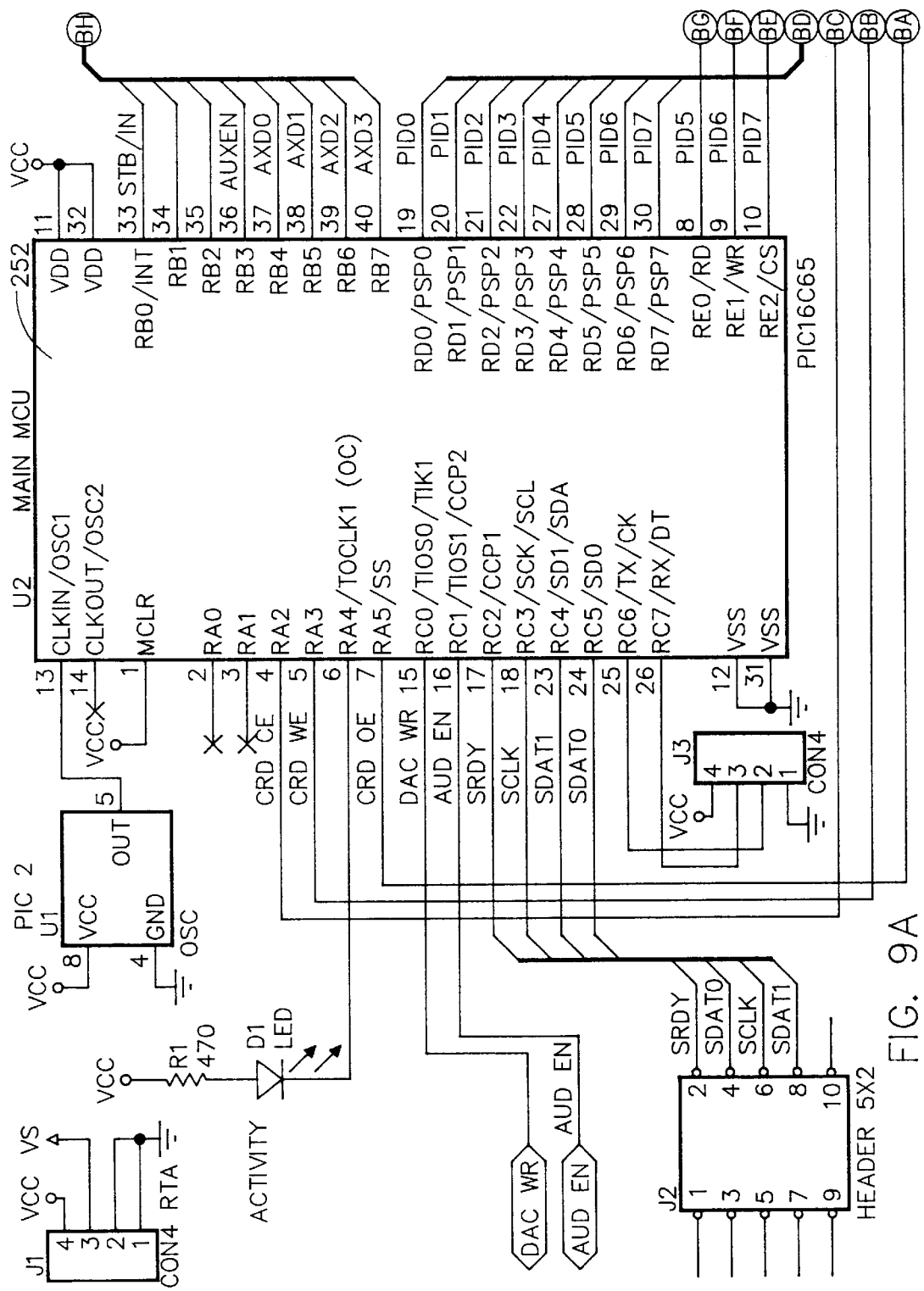
FIGS. 9A–9C are detailed circuit diagram of an alternative embodiment of an audio board output device for attachment to the programmable electronic activity detector and command generator of the present invention.
Figure 9B:
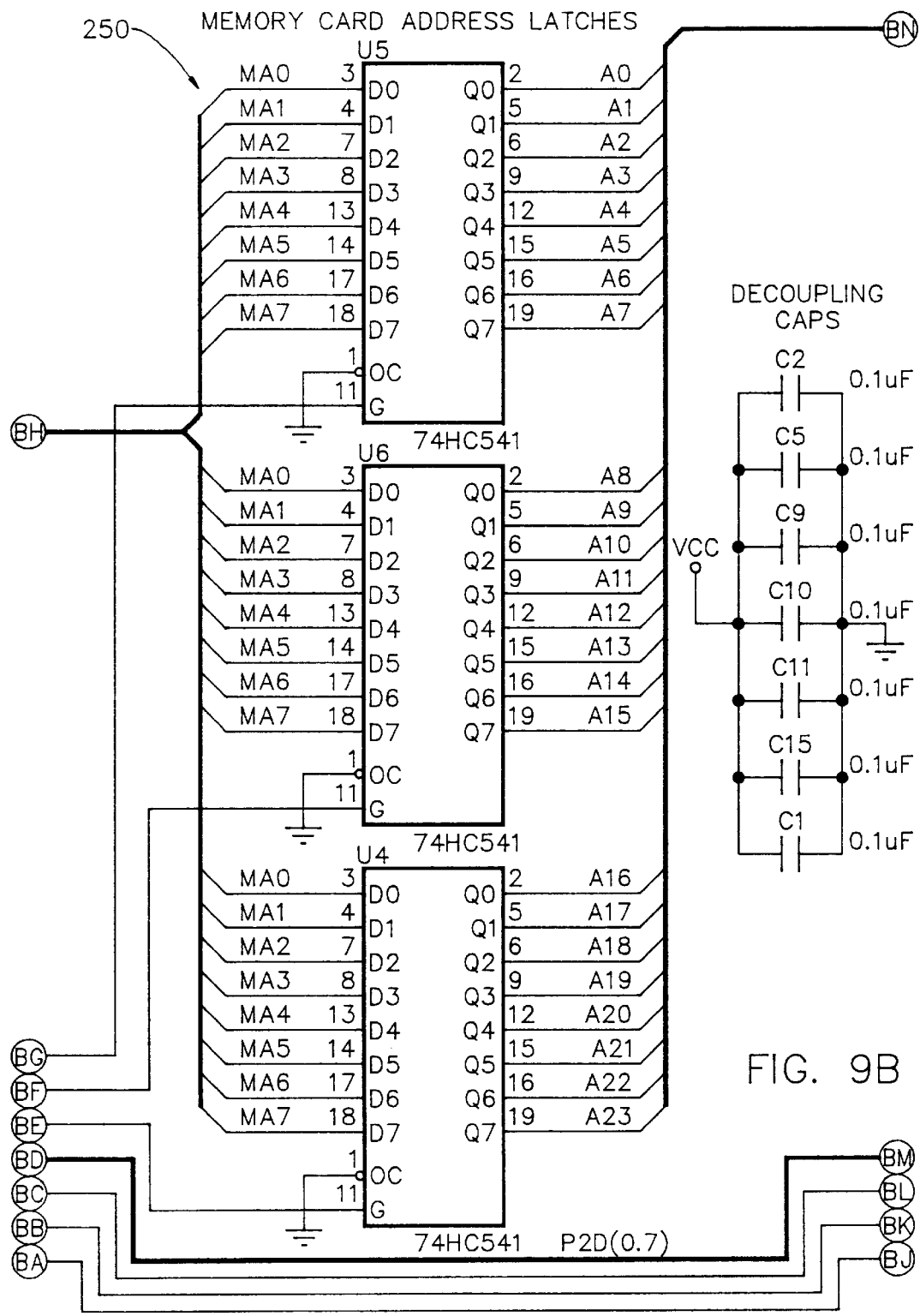
Figure 9C:
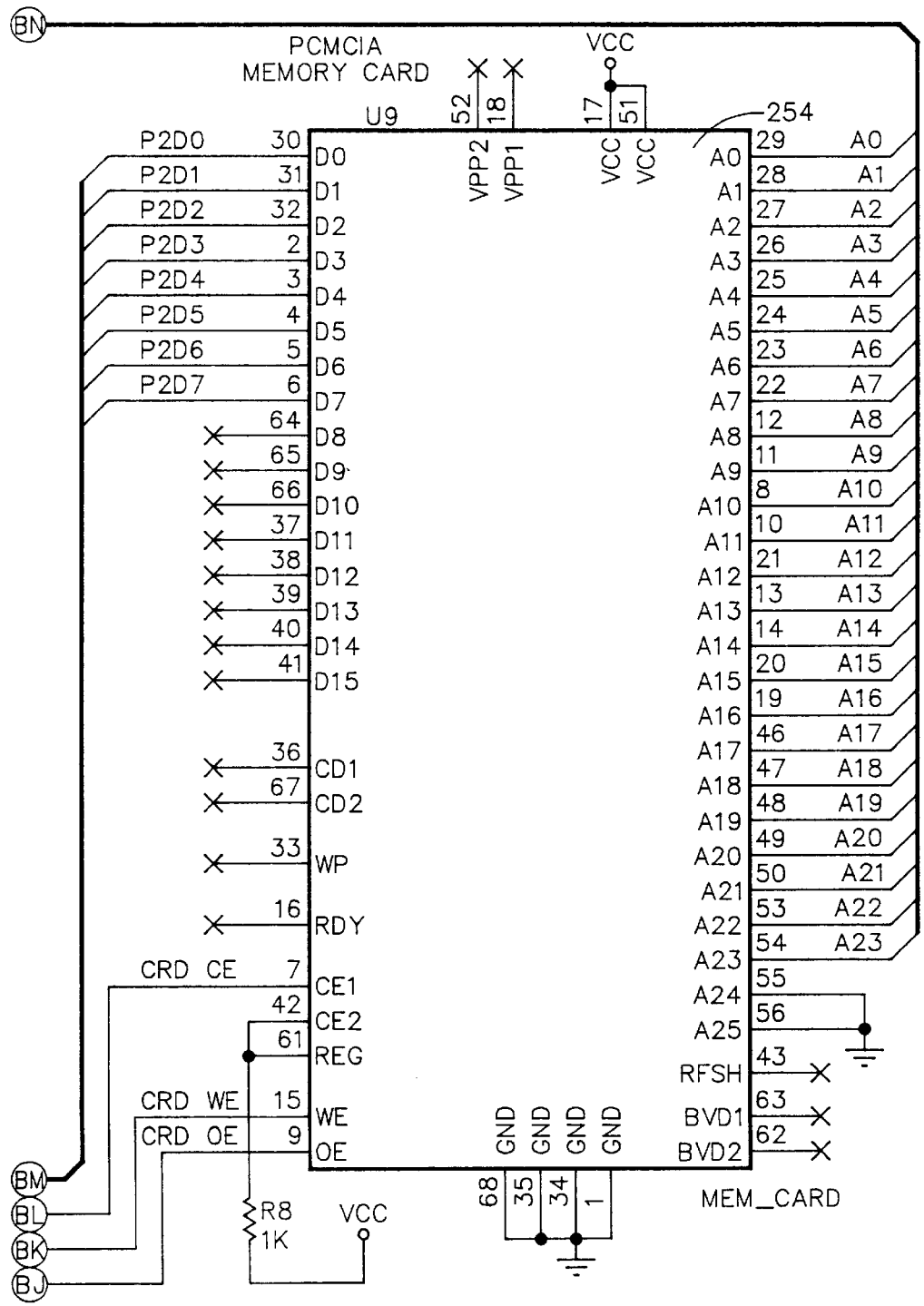
Figure 10A:
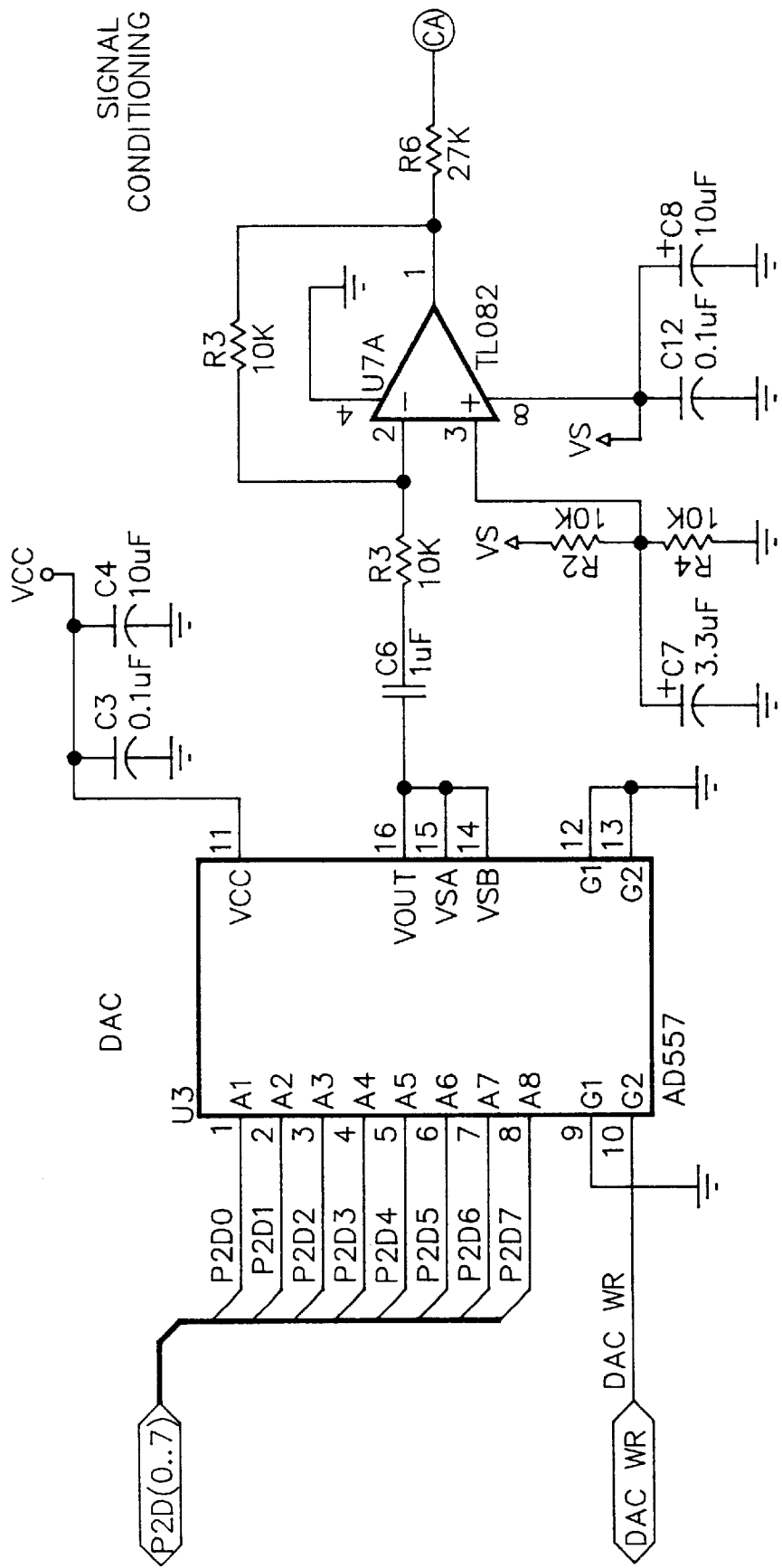
FIGS. 10A–10B are detailed circuit diagram of the alternative embodiment of the audio board showing the audio output therefrom.
Figure 10B:
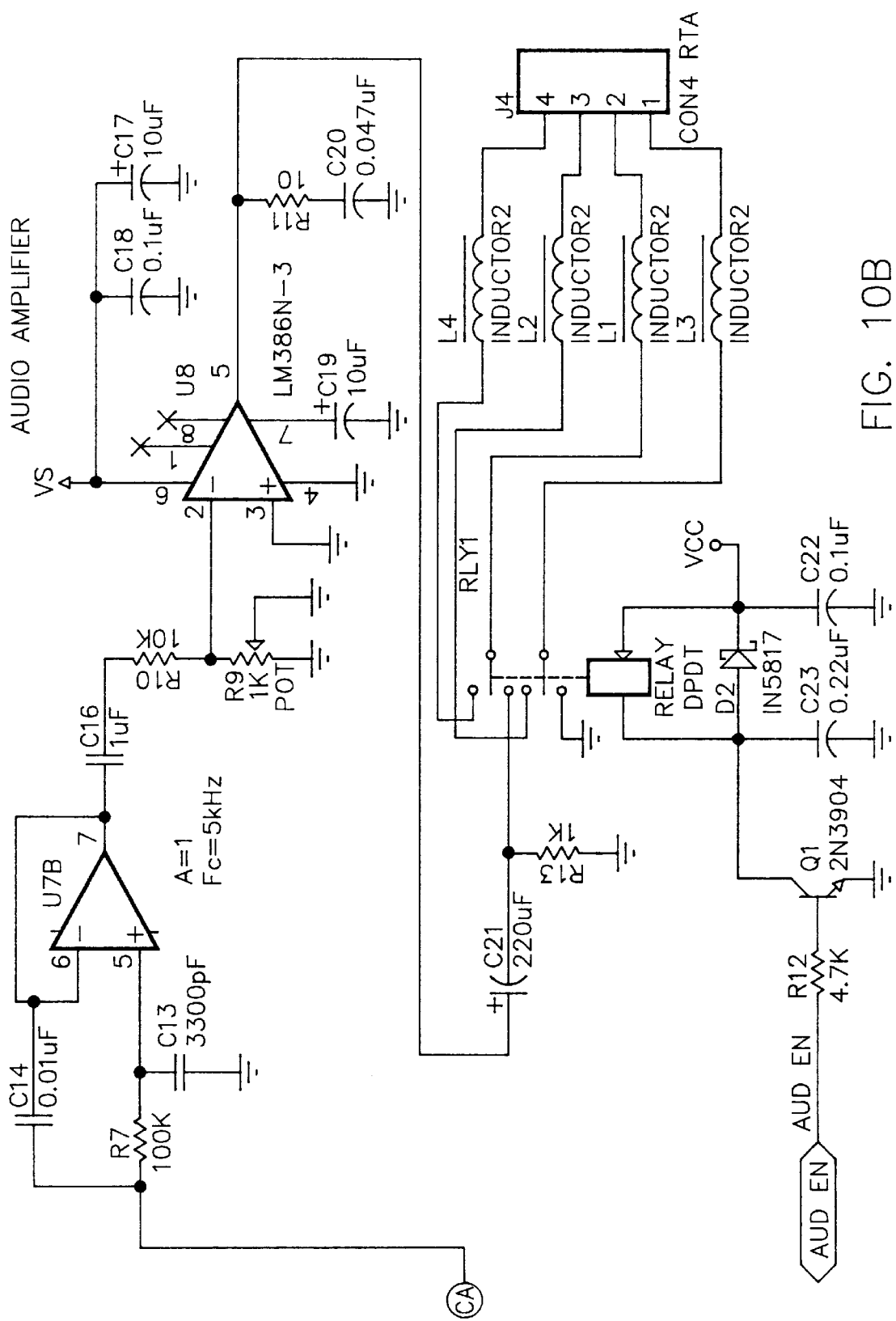

FIGS. 6–8E illustrate an alternative embodiment of the programmable electronic activity detector and command generator 200 of the present invention. This embodiment is similar in general form to the first embodiment shown in FIGS. 1A–5 but has been somewhat modified to take fuller advantage of the detection and command possibilities provided by this invention. As shown in FIG. 6, the embodiment includes a machine interface 202 which consists of the connection of the programmable electronic activity detector and command generator 200 to the circuit board 300 of an electronic device. In this instance, as shown in FIGS. 6–8E, the electronic device would be a typical slot machine having display data output, machine input information and machine output information which may be either sampled on the circuit board itself as will be necessary with many retrofit situations, or the slot machine may include a wiring harness which allows for simple connection to each of the data output locations from the circuit board. In either event, the machine interface 202 will access the information sites on the circuit board and allow for the event occurrence data to be transferred to the programmable electronic activity detector and command generator 200.

The machine interface 200 is connected, in the preferred embodiment, through a series of diodes and dip switches to the optical isolators 204a–o which operate in substantially similar manner to that described in connection with the embodiment shown in FIGS. 1A–5. Each of the optical isolators 204a–o are connected to one of the machine output lines 201a–o and therefore when an event occurs on any of the machine output lines 201a–o, the optical isolator 204a–o associated with that event will signify the occurrence of that event yet prevent any potential modification of the event status due to the one-way nature of the optical isolators. After the optical isolator 204a–o activates in response to event occurrence on the machine board, the event occurrence notification signal corresponding to that event occurrence is transmitted to the data capture segment 206 of the embodiment 200.

The data capture segment 206 consists of a plurality of input registers which receive the incoming event occurrence notification signal from the optical isolators 204a–o and interfaces the signal from the machine interface 202 to the event occurrence information signal computing device or main computing unit 240. The input registers 208b and 208c are each preferably connected to the machine inputs and machine outputs on the machine output line 201d–o whereas input register 208a is preferably connected to the display data coming from machine output lines 201a, 201b and 201c. The display data is in serial format coming from the circuit board 300 of the slot machine and thus must be changed over to parallel to permit the main computing unit 240 to access the incoming display data. For this reason, each of the incoming display unit lines is converted from serial to parallel format by an appropriate converter, shown as converter units 210a, 210b and 210c. The display data is then fed into input register 208a before being forwarded onto the main computing unit 240. Finally, input register 208d is designed for use with eight-bit addressing systems for future possible uses.

It should be clear that an additional operational feature of the data capture portion 206 of the embodiment 200 of FIGS. 6–8E is that the data capture portion 206 must be organized to permit the main computing unit 240 to sample the incoming data to determine event occurrences on the circuit board 300 of the slot machine. This would commonly be done by clock pulse synchronization or multiplexing in which the main computing unit 240 is programmed to periodically "poll" each of the input registers 208a–d to determine if an event has occurred. Each of the input registers 208a–d may be polled in turn to determine an event occurrence detected by the input registers 208a–d thus permitting the connection of all of the input register outputs to be placed on a signal bus line 212 leading to the main computing unit 240. The polling operation will be made more clear in the discussion regarding the main computing unit 240, but it should be generally understood that the input registers 208a–d operate in a similar manner as that described in connection with event detection sampling chip 12 of the programmable sound card 10 as described in the embodiment of FIGS. 1A–5.

The input registers 208a–d of the data capture portion 206 are connected in information transmission connection by bus 212 to the programmable event occurrence information signal computing device 240 which will be referred to herein as the MCU (main computing unit). The MCU 240 is programmed to scan the input registers within the data capture portion 206 of the alternative embodiment and remove, identify and compare the event occurrence notification signals found within those registers to a decision table preloaded into the registers of the MCU 240 itself. This decision table may take any accepted form so long as the MCU 240 is able to access the data, identify particular event occurrence information signals and output command signals to connected output devices which command those output devices to perform certain functions based on particular machine events. For example, common machine events may include coin in, handle pull, jackpot, or any other payoff combination or the like.

As was described previously in connection with the embodiment of FIGS. 1A–4, the MCU 240 will preferably be an eight-bit CMOS microcontroller manufactured by Microchip Technology, Inc., part No. PIC16C6X. Of course, it is to be understood that numerous other types of microcontrollers may be used with the present invention provided those microcontrollers are programmable to perform the same or similar operations. Although the MCU 240 is shown as being wired into the system in one particular design in FIG. 8D, it should be further understood that the exact layout and connection of the hardware elements described herein is not overly critical to the present invention so long as the embodiment 200 is able to function as intended. Furthermore, as was described in connection with the main CPU 56 of programmable sound card 10, the MCU 240 is programmed using RISC code, a preferred example of which is shown in Appendix "D". Again, however, it is to be understood that the exact object code to be used in the MCU 240 is not critical to the invention so long as the MCU 240 operates to perform all of its intended functions.

When the MCU 240 identifies that an event occurrence information signal received from one of the input registers 208a–d corresponds to a table event within the register of the MCU 240, the MCU 240, due to its programming, determines that a command signal should be sent to a connected output device. As best seen in FIG. 6, the MCU 240 is programmed and hardwired to output command signals in two basic formats, one being a simple command pulse or device trigger for the triggering of an output device such as a bell, whistle, or light, and the second being a serial interface for connection to more sophisticated output devices such as a sound card or a printer. The programmable electronic activity detector and command generator 200 of the present invention is designed to substitute alternative output device responses for particular event occurrences in the slot machine. Obviously, modification and/or replacement of all of the event occurrences produced by the machine is not necessary nor even advisable in many instances and therefore the MCU 240 is operative to replace or supplement only those events designated for replacement by the event table in the MCU and allow the remaining machine outputs to be produced normally by the slot machine.

When the MCU 240 detects that an designated event has occurred in the slot machine by a match of a selected event occurrence information signal and an event held within the table, the MCU 240 generates a command signal which is sent to connected output devices. Depending on the event occurrence in the slot machine, the command signal which is output by the MCU 240 will be a command pulse, which will be sent via the auxiliary triggers 242a and 242b which send a simple trigger pulse to connected output devices designed for activation by such command pulses, or will be a serial format command signal for commanding serial output devices such as an audio card 250, an example of which is shown in FIGS. 9A–9C and 10, or a printer or other such serial output device. The information transmission connection of the MCU 240 to the serial output devices would preferably consist of a serial peripheral interface 244 of an industry standard format. Finally, the serial command signals output by the MCU 240 would preferably be in standard serial format to permit the use of many different types of output devices with the programmable electronic activity detector and command generator 200, connection to which would be by a standard serial cable.

The audio board 250 is best shown in FIGS. 9A–9C and 10 and is generally similar in operation to the audio portion (memory manager chip 58 and audio file storage memory 60) of the programmable sound card 10 described previously. A detailed discussion of the features of the audio board 250 is thus unnecessary and redundant, as the features shown in FIGS. 9A–9C and 10 are substantially similar to those features described previously. For additional clarification of the operation of the audio board, a copy of the RISC program associated therewith is enclosed herewith as Appendix "E". The audio board 250, specifically the audio board MCU 252, would be programmed according to the code set forth in Appendix "E", but, of course, variations in the programming of the audio board 250 would be expected so long as the operational aspects of the audio board 250 are maintained.

As was previously discussed in connection with the audio portion of the programmable sound card 10, the audio board 250 further includes a memory card 254, which, in the preferred embodiment, would be a PC/MCIA memory card. It should be understood that the operational characteristics of the audio board 250 are generally similar to those described in connection with the audio portion of the programmable sound card 10, and therefore further description of the audio board 250 is unnecessary due to the description provided previously, the features shown in FIGS. 9A–9C and 10, and the accompanying RISC program in Appendix "E".

The command signals sent by the MCU 240 would preferably be in the format commonly used for command of printers, sound cards and the like to facilitate the use of the present invention with already existing hardware, and the programming and operation of such devices is well-known in the prior art. One important aspect of the present invention is that allowance has been made for the MCU 240 to include a network interface 260 which can be used to connect the programmable electronic activity detector and command generator 200 to a central control system (not shown). Through the network interface 260, the central control system will be able to collect event information from the slot machine and also will be able to download command information to the programmable electronic activity detector and command generator 200 to activate connected output devices. A prime example of the use of this connection would be to immediately reward a game player upon hitting a certain combination on the reels, which was being monitored over the central control system. It is expected that the network system would be implemented as was previously discussed, although any appropriate network system could be used for the present invention.

One other possible use of the present invention is as a tie-in with state-run lotteries in which the network capabilities of the present invention would be used to provide a wide-area "Powerball" type jackpot payoff on one particular combination being achieved. The specific nature of this implementation will be made apparent in future documentation, but this and other such examples serve to illustrate the virtually limitless possibilities for use of the present invention.

It is to be understood that numerous additions, modifications, and substitutions may be made to the programmable sound card 10 and programmable electronic activity detector and command generator 200 of the present invention which fall within the intended broad scope of the appended claims. For example, the three microprocessors, the event detection sampling chip 12, main CPU 56, and memory manager chip 58, may potentially be combined into a single microprocessor chip programmed to perform the functions of each of the three chips 12, 56, and 58. Furthermore, the specific object code used to program the microprocessors 12, 56, 58, 240 and 252 may be modified or changed in many ways so long as the function of each of the elements of the programmable sound card 10 and programmable electronic activity detector and command generator 200 are able to function in an efficient manner. Also, the read-only detection devices of the present invention, described herein as optical interfaces, may be modified, changed or replaced entirely with read-only detection devices which fulfill the intended function of identification of event occurrences and transfer of that information to the programmable sound card 10 and programmable electronic activity detector and command generator 200. Possibilities include optical readers which read the reel combinations produced by the machine and electromagnetic pulse detectors for detection of event occurrence signals. Finally, the exact designs and structures of the programmable sound card 10 and programmable electronic activity detector and command generator 200 may be rearranged or modified as necessary to fit within the slot machine board environment.

There has thus been shown and described a programmable sound card 10 and a programmable electronic activity detector and command generator 200 which accomplishes at least all of the stated objectives.

I claim:

1. A programmable electronic activity detector and command generator device for an electronic apparatus, said device comprising;

at least one read-only detection means adapted for connection to an electronic apparatus, said read-only detection means operative to detect selected event occurrences on an electronic apparatus and output event occurrence notification signals upon detection of an event;

event detection sampling means in information transmission connection with said read-only detection means, said event detection sampling means operative to detect and receive event occurrence notification signals from said read-only detection means, analyze said event occurrence notification signals and output event occurrence information signals including information specifying event occurrences;

event occurrence information signal computing means in information transmission connection with said event detection sampling means, said signal computing means operative to receive and analyze said event occurrence information signals output by said event detection sampling means and upon detection of selected event occurrence information signals, output command signals for initiating at least one connected output device to perform a selected operation corresponding to said command signal;

said at least one output device operative to accept command signals from the programmable event occurrence information signal computing device and output the appointed output device response corresponding to said command signal.

2. The programmable electronic activity detector and command generator device of claim 1 wherein said read-only detection means comprise optical interfaces including two input lines, a first event occurrence line and steady voltage line, said lines connected to one another by a light-emitting diode capable of emitting a light pulse upon said event occurrence line signaling an event occurrence, said light pulse emitted by said light-emitting diode being detected by a light-sensitive transistor spaced from said light-emitting diode, the output end of said light-sensitive transistor further connected to the base of a second transistor operative to output one of said event occurrence notification signals to said event detection sampling means whereby said optical interface transfers an exact duplicate of the event occurrence signal output from an electronic apparatus to said event detection sampling means, said signal being sampled in a non-intrusive manner.

3. The programmable electronic activity detector and command generator device of claim 1 wherein said event detection sampling means comprises at least one input register operative to monitor said read-only detection means such that any event occurrence on said electronic apparatus will be detected and stored for access by said event occurrence information signal computing means.

4. The programmable electronic activity detector and command generator device of claim 3 wherein said event detection sampling means is operative to receive and analyze said event occurrence signals output by an electronic apparatus to determine the specific event that has occurred in an electronic apparatus, said event detection sampling means operative to store said event in data storage registers within said event detection sampling means.

5. The programmable electronic activity detector and command generator device of claim 4 wherein said event occurrence information signal computing means comprises a programmable microcontroller chip programmed to scan said data storage registers within said event detection sampling means and remove, identify and compare a selected event occurrence notification signal found within a selected data storage register of said event detection sampling means with an event occurrence table hardcoded into data storage registers within said event occurrence information signal computing means, said table corresponding to selected event occurrence information signals which in turn correspond to particular event occurrences on an electronic apparatus.

6. The programmable electronic activity detector and command generator device of claim 5 wherein said event occurrence information signal computing means further is operative to identify a match of an event occurrence information signal and an event occurrence number within said registers of said event occurrence information signal computing means, said event occurrence information signal computing means operative to output one of said command signals related to said event occurrence number to at least one of said connected output devices.

7. The programmable electronic activity detector and command generator device of claim 6 further comprising a read/write audio file storage memory means comprises a programmable microcontroller chip programmed to track the starting and ending points and the playback speed of audio files, and further comprises an audio file storage device for storing audio files.

8. The programmable electronic activity detector and command generator device of claim 7 wherein said audio file storage device comprises a PC/MCIA memory card.

9. The programmable electronic activity detector and command generator device of claim 8 further comprising an audio file output means including in combination a digital to analog converter unit operative to convert audio files downloaded from said read/write audio file storage memory means into an audio wave, and an amplifier loudspeaker system operative to amplify the audio wave for outputting the audio wave as an original sampled sound.

10. A programmable sound card for a slot machine, said sound card comprising:

at least one read-only detection device operative to detect selected event occurrences on a slot machine and output event occurrence notification signals upon detection of an event;

event detection sampling means in information transmission connection with said read-only detection devices, said event detection sampling means operative to detect and receive event occurrence notification signals from said read-only detection devices, analyze said event occurrence notification signals and output event occurrence information signals including information specifying event occurrences;

event occurrence information signal computing means in information transmission connection with said event detection sampling means, said signal computing means operative to receive and analyze said event occurrence information signals output by said event detection sampling means and upon detection of selected event occurrence information signals, output sound generation command signals for initiating generation of selected sounds by said programmable sound card;

memory manager means in information transmission connection with said event occurrence information signal computing means, said memory manager means operative to store audio file location, length and playback speed information, said memory manager means further operative to initiate playback of selected audio files in response to reception of sound generation command signals;

audio file storage means in information transmission connection with said memory manager means, said audio file storage means operative to store audio files in retrievable form, said audio file storage means operative to output selected audio files upon reception of initiation commands from said memory manager means; and audio file output means in information transmission connection with said audio file storage means for transferring said selected audio files from said audio file storage means to a sound producing device, said audio file output means operative to convert said audio signals to a format for driving a sound producing device.

11. A programmable sound card for a gaming device, said sound card comprising:

at least one detection device operative to detect selected event occurrences on a gaming device and output event occurrence notification signals upon detection of an event;

central processing means in information transmission connection with said detection devices, said central processing means including an event detection sampling section, an event occurrence information signal computing section and a memory manager section;

said event detection sampling section in information transmission connection with said detection devices, said event detection sampling section operative to detect and receive event occurrence notification signals from said detection devices, analyze said event occurrence notification signals and output event occurrence information signals including information specifying event occurrences;

said event occurrence information signal computing section in information transmission connection with said event detection sampling section, said signal computing section operative to receive and analyze said event occurrence information signals output by said event detection sampling section and upon detection of selected event occurrence information signals, output sound generation command signals for initiating generation of selected sounds by said programmable sound card;

said memory manager section in information transmission connection with said event occurrence information signal computing section, said memory manager section operative to store audio file location, length and playback speed information, said memory manager section further operative to initiate playback of selected audio files in response to reception of sound generation command signals;

audio file storage means in information transmission connection with said memory manager section of said central processing means, said audio file storage means operative to store audio files in retrievable form, said audio file storage means operative to output selected audio files upon reception of initiation commands from said memory manager means; and audio file output means in information transmission connection with said audio file storage means for outputting said audio files.

12. A programmable electronic activity detector and command generator device for an electronic apparatus, said device comprising:

at least one read-only detection means adapted for connection to an electronic apparatus, said read-only detection means operative to detect selected event occurrences on an electronic apparatus and output event occurrence notification signals upon detection of an event;

event detection sampling means in information transmission connection with said read-only detection means, said event detection sampling means operative to detect and receive event occurrence notification signals from said read-only detection means, analyze said event occurrence notification signals and output event occurrence information signals including information specifying event occurrences; and event occurrence information signal computing means in information transmission connection with said event detection sampling means, said signal computing means operative to receive and analyze said event occurrence information signals output by said event detection sampling means and upon detection of selected event occurrence information signals, output command signals for initiating at least one connected output device to perform a selected operation corresponding to said command signal.

* * * * *